United States Patent
Okuda et al.

(10) Patent No.: US 8,870,358 B2
(45) Date of Patent: *Oct. 28, 2014

(54) WATER-BASED INK FOR INK-JET RECORDING, INK CARTRIDGE, WATER-BASED INK SET FOR INK-JET RECORDING, INK-JET RECORDING METHOD, AND INK-JET RECORDING APPARATUS

(75) Inventors: Satoshi Okuda, Inazawa (JP); Masaya Fujioka, Nagoya (JP); Noriaki Satoh, Nagoya (JP); Tatsunosuke Hoshi, Nagoya (JP); Junichiro Sugimoto, Nagoya (JP); Kenjiro Imai, Nagoya (JP); Eiji Kawamura, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 379 days.

This patent is subject to a terminal disclaimer.

(21) Appl. No.: 13/359,523

(22) Filed: Jan. 27, 2012

(65) Prior Publication Data

US 2012/0249647 A1 Oct. 4, 2012

(30) Foreign Application Priority Data

Mar. 31, 2011 (JP) ................... 2011-080927
Mar. 31, 2011 (JP) ................... 2011-080929
Mar. 31, 2011 (JP) ................... 2011-080930

(51) Int. Cl.
*B41J 2/01* (2006.01)
*C09D 11/54* (2014.01)
*B41J 2/21* (2006.01)
*C09D 11/40* (2014.01)

(52) U.S. Cl.
CPC .............. *C09D 11/54* (2013.01); *B41J 2/2107* (2013.01); *B41J 2/01* (2013.01); *C09D 11/40* (2013.01)
USPC ............................................ 347/100; 347/95

(58) Field of Classification Search
CPC ........... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ......... 347/100, 95, 96, 101, 102, 103, 88, 99, 347/33, 20, 9.29; 106/31.6, 31.13, 31.27; 523/160, 161
See application file for complete search history.

(56) References Cited

U.S. PATENT DOCUMENTS 5,609,671 A 3/1997 Nagasawa
5,837,045 A 11/1998 Johnson et al.
(Continued)

FOREIGN PATENT DOCUMENTS

JP 08-003498 1/1996
JP 2000-513396 10/2000
(Continued)

OTHER PUBLICATIONS

Extended EP Search Report mailed Jul. 17, 2012, EP Appln. 12153120.6-2102.

*Primary Examiner* — Manish S Shah
(74) *Attorney, Agent, or Firm* — Banner & Witcoff, Ltd.

(57) ABSTRACT

Disclosed is a water-based ink for ink jet recording, including: a colorant; water; and tetraethylene glycol monobutyl ether and pentaethylene glycol monobutyl ether, wherein: tetraethylene glycol monobutyl ether and pentaethylene glycol monobutyl ether are contained by 1% by weight to 10% by weight in total in the water-based ink for ink jet recording; and a weight ratio (X:Y) of tetraethylene glycol monobutyl ether (X) to pentaethylene glycol monobutyl ether (Y) is 50:50 to 90:10.

21 Claims, 8 Drawing Sheets

(56) References Cited

U.S. PATENT DOCUMENTS

| | | |
|---|---|---|
| 5,938,829 A | 8/1999 | Higashiyama et al. |
| 7,125,447 B2 | 10/2006 | Sugita et al. |
| 7,156,909 B2 | 1/2007 | Oyanagi et al. |
| 2002/0044185 A1 | 4/2002 | Koitabashi et al. |
| 2004/0094067 A1 | 5/2004 | Oyanagi et al. |
| 2004/0123774 A1 | 7/2004 | Yamazaki et al. |
| 2004/0266907 A1 | 12/2004 | Sugita et al. |
| 2006/0201380 A1 | 9/2006 | Kowalski et al. |
| 2007/0100023 A1 | 5/2007 | Burns et al. |
| 2007/0100024 A1 | 5/2007 | Gu et al. |
| 2009/0025605 A1* | 1/2009 | Ishimaru et al. ............... 347/100 |
| 2009/0043081 A1* | 2/2009 | Arai et al. .................... 347/100 |
| 2010/0159212 A1 | 6/2010 | Otsuka et al. |
| 2010/0231670 A1* | 9/2010 | Arai et al. ..................... 347/100 |
| 2010/0253734 A1* | 10/2010 | Ikeda et al. ..................... 347/21 |

FOREIGN PATENT DOCUMENTS

| | | |
|---|---|---|
| JP | 2002-079740 | 3/2002 |
| JP | 2004-331751 | 11/2004 |
| JP | 2008-524400 | 7/2008 |
| JP | 2009-007458 | 1/2009 |
| JP | 2009-515007 | 4/2009 |
| JP | 2010-037363 | 2/2010 |
| WO | 02-055619 | 7/2002 |
| WO | 2004-007626 | 1/2004 |

* cited by examiner

WATER-BASED INK FOR INK-JET RECORDING, INK CARTRIDGE, WATER-BASED INK SET FOR INK-JET RECORDING, INK-JET RECORDING METHOD, AND INK-JET RECORDING APPARATUS

CROSS REFERENCE TO RELATED APPLICATION

The present application claims priority from Japanese Patent Application No. 2011-080927 filed on Mar. 31, 2011, Japanese Patent Application No. 2011-080929 filed on Mar. 31, 2011, and Japanese Patent Application No. 2011-080930 filed on Mar. 31, 2011 the disclosure of which is incorporated herein by reference in its entirety.

BACKGROUND OF THE INVENTION

1. Field of the Invention

The present invention relates to a water-based ink for ink jet recording, an ink cartridge, a water-based ink set for ink jet recording, an ink jet recording method, and an ink-jet recording apparatus.

2. Description of the Related Art

Conventionally, a water-based ink for ink-jet recording, which is blended with triethylene glycol monobutyl ether as a penetrant for adjusting the drying speed on the recording medium, is used generally and widely.

Such a conventional water-based ink is excellent in the discharge stability when a head is maintained in an uncapped state and the drying performance on paper surface. If any problem arises in relation to the discharge stability obtained when the head is maintained in the uncapped state, a water-based ink undergoes the increase in viscosity in a period of time shorter than a desired maintaining time and the discharge characteristic is deteriorated, although it is intended to maintain the stability of the discharge for a period of time as long as possible. The drying performance on paper surface means the easiness of the drying caused when a water-based ink is discharged on the recording medium. However, in the case of the water-based ink as described above, any compound, which originates from the material for forming an ink jet recording apparatus, is eluted into the water-based ink in some cases. The material, which forms the ink jet recording apparatus as described above, is exemplified, for example, by a rubber member and a member of organic material other than rubber material. The rubber member is exemplified, for example, by a wiper and a cap. The wiper wipes, for example, a nozzle surface of the ink jet head. The cap shuts off, for example, the nozzle surface from the external environment. If any compound, which originates from, for example, the rubber member, is eluted into the water-based ink, the compound is deposited in the water-based ink in some cases. If the compound is deposited, for example, it is feared that the nozzles of the ink-jet head may be clogged-up.

On the other hand, a treatment solution (process liquid), which contains an aggregating agent such as a polyvalent metal salt or the like for causing a colorant contained in a water-based ink to aggregate, is used in some cases before performing the ink jet recording by using the water-based ink in order to improve the optical density (OD value) of a recorded matter. When a water-based ink set for ink jet recording, in which the water-based ink and the treatment solution are combined, is used, then the optical density (OD value) of the recorded matter is improved, but the total liquid amount is increased on the recording medium due to the use of the treatment solution. Therefore, the drying performance on paper surface is deteriorated. The drying performance on paper surface means the easiness of drying when the water-based ink and the treatment solution are applied onto the recording medium.

SUMMARY OF THE INVENTION

An object of the present teaching is to provide a water-based ink for ink jet recording which is excellent in the discharge stability obtained when a head is maintained in an uncapped state and the drying performance on paper surface, wherein any compound originating from, for example, a rubber member included in an ink-jet recording apparatus is suppressed from being eluted into the water-based ink. Another object of the present teaching is to provide a water-based ink set for ink-jet recording which makes it possible to improve the optical density (OD value) of a recorded matter while suppressing the decrease in the drying performance on paper surface.

According to a first aspect of the present teaching, there is provided a water-based ink for ink jet recording, including: a colorant; water; and tetraethylene glycol monobutyl ether and pentaethylene glycol monobutyl ether, wherein: tetraethylene glycol monobutyl ether and pentaethylene glycol monobutyl ether are contained by 1% by weight to 10% by weight in total in the water-based ink for ink-jet recording; and a weight ratio (X:Y) of tetraethylene glycol monobutyl ether (X) to pentaethylene glycol monobutyl ether (Y) is 50:50 to 90:10.

According to a second aspect of the present teaching, there is provided an ink cartridge including the water-based ink for ink jet recording as defined in the first aspect.

According to a third aspect of the present teaching, there is provided a water-based ink set for ink jet recording, including the water-based ink for ink jet recording as defined in the first aspect; and a treatment solution which aggregates the colorant contained in the water-based ink for ink jet recording.

According to a fourth aspect of the present teaching, there is provided an ink-jet recording method for performing recording on a recording medium, including preparing the water-based ink for ink jet recording as defined in the first aspect; and discharging the water-based ink for ink jet recording onto the recording medium.

According to a fifth aspect of the present teaching, there is provided an ink-jet recording apparatus for performing recording on a recording medium, including an ink accommodating section which accommodates the water-based ink for ink jet recording as defined in the first aspect; and an ink discharge mechanism which discharges, onto the recording medium, the water-based ink for ink jet recording accommodated in the ink accommodating section.

According to a sixth aspect of the present teaching, there is provided an ink jet recording apparatus for performing recording on a recording medium, including an ink set accommodating section which accommodates the water-based ink set for ink-jet recording as defined in the third aspect; an ink discharge mechanism which discharges, onto the recording medium, the water-based ink for ink-jet recording of the ink set accommodated in the ink set accommodating section; and a treatment solution applying mechanism which applies, to the recording medium, the treatment solution of the ink set accommodated in the ink set accommodating section.

DESCRIPTION OF THE PREFERRED EMBODIMENTS

Figure 1:
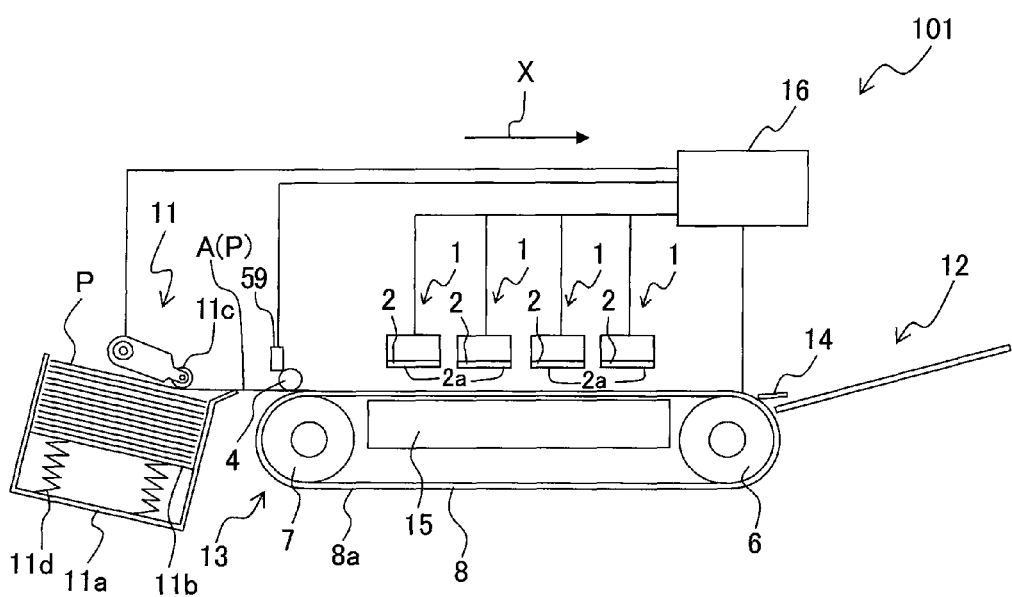
FIG. 1 schematically shows an exemplary ink-jet recording apparatus according to the present teaching.

The water-based ink for ink-jet recording of the present teaching (hereinafter referred to as "water-based ink" or "ink" in some cases) contains the colorant, water, and the penetrant. The water-based ink of the present teaching may contain other components other than the colorant, water, and the penetrant.

The colorant may be either a pigment or a dye. Alternatively, any pigment and any dye may be mixed and used as the colorant.

The pigment is exemplified, for example, by carbon black, inorganic pigments, and organic pigments. The carbon black is exemplified, for example, by furnace black, lamp black, acetylene black, and channel black. The inorganic pigment may be exemplified, for example, by titanium oxide, inorganic pigments based on iron oxide, and inorganic pigments based on carbon black. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. Specified examples of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may be any self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group, and phosphoric acid group is introduced into the pigment particles by the chemical bond directly or with any other group intervening therebetween. Those usable as the self-dispersible pigment include, for example, those in which the pigment is treated or processed in accordance with any method described, for example, in Japanese Patent Application Laid-open No. 8-3498, Japanese Patent Application Laid-open No. 2000-513396 (PCT), Japanese Patent Application Laid-open No. 2008-524400 (PCT), and Japanese Patent Application Laid-open No. 2009-515007 (PCT). As for the raw material for the self-dispersible pigment, it is possible to use any one of inorganic pigments and organic pigments. The pigment, which is suitable to perform the treatment as described above, includes, for example, carbon blacks such as "MA8" and "MA100" produced by Mitsubishi Chemical Corporation and "Color Black FW200" produced by Degussa. For example, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd.

The blending amount of the solid content of the pigment with respect to the total amount of the water-based ink (pigment solid content amount) is not specifically limited, which can be appropriately determined depending on, for example, the desired optical density and the coloration or colorfulness. The pigment solid content amount is, for example, 0.1% by weight to 20% by weight, preferably 1% by weight to 10% by weight, and more preferably 2% by weight to 8% by weight.

The dye is not specifically limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black is exemplified, for example, by C. I. Direct Blacks 17, 19, 32, 51, 71, 108, 146, 154, and 168. C. I. Direct Blue is exemplified, for example, by C. I. Direct Blues 6, 22, 25, 71, 86, 90, 106, and 199. C. I. Direct Red is exemplified, for example, by C. I. Direct Reds 1, 4, 17, 28, 83, and 227. C. I. Direct Yellow is exemplified, for example, by C. I. Direct Yellows 12, 24, 26, 86, 98, 132, 142, and 173. C. I. Direct Orange is exemplified, for example, by C. I. Direct Oranges 34, 39, 44, 46, and 60. C. I. Direct Violet is exemplified, for example, by C. I. Direct Violets 47 and 48. C. I. Direct Brown is exemplified, for example, by C. I. Direct Brown 109. C. I. Direct Green is exemplified, for example, by C. I. Direct Green 59. C. I. Acid Black is exemplified, for example, by C. I. Acid Blacks 2, 7, 24, 26, 31, 52, 63, 112, and 118. C. I. Acid Blue is exemplified, for example, by C. I. Acid Blues 9, 22, 40, 59, 93, 102, 104, 117, 120, 167, 229, and 234. C. I. Acid Red is exemplified, for example, by C. I. Acid Reds 1, 6, 32, 37, 51, 52, 80, 85, 87, 92, 94, 115, 180, 256, 289, 315, and 317. C. I.

Acid Yellow is exemplified, for example, by C. I. Acid Yellows 11, 17, 23, 25, 29, 42, 61, and 71. C. I. Acid Orange is exemplified, for example, by C. I. Acid Oranges 7 and 19. C. I. Acid Violet is exemplified, for example, by C. I. Acid Violet 49. C. I. Basic Black is exemplified, for example, by C. I. Basic Black 2. C. I. Basic Blue is exemplified, for example, by C. I. Basic Blues 1, 3, 5, 7, 9, 24, 25, 26, 28, and 29. C. I. Basic Red is exemplified, for example, by C. I. Basic Reds 1, 2, 9, 12, 13, 14, and 37. C. I. Basic Violet is exemplified, for example, by C. I. Basic Violets 7, 14, and 27. C. I. Food Black is exemplified, for example, by C. I. Food Blacks 1 and 2.

The blending amount of the dye with respect to the total amount of the water-based ink is not specifically limited, which is, for example, 0.1% by weight to 20% by weight, and preferably 0.3% by weight to 10% by weight.

One type of the colorant may be used singly. Alternatively, two or more types of the colorants may be used in combination.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

The penetrant includes tetraethylene glycol monobutyl ether (tetra-PB) and pentaethylene glycol monobutyl ether (penta-PB). The weight ratio (X:Y) between tetra-PB (X) and penta-PB (Y) in the water-based ink is X:Y=50:50 to 90:10. The total blending amount (X+Y) of tetra-PB (X) and penta-PB (Y) with respect to the total amount of the water-based ink is X+Y=1% by weight to 10% by weight. The water-based ink of the present teaching, in which tetra-PB and penta-PB are thus used as the penetrants at the specified weight ratio described above and at the specified ratio described above with respect to the total amount of the water-based ink, is excellent in the discharge stability obtained when the head is maintained in the uncapped state and the drying performance on paper surface. Further, any compound, which originates, for example, from the rubber member or the like included in the ink jet recording apparatus, is also suppressed from being eluted into the water-based ink. Further, in the case of the water-based ink of the present teaching, the meniscus pressure resistance is also improved at the nozzles of the ink-jet head. The "meniscus pressure resistance" means the maximum value of the pressure at which the water-based ink does not leak from the nozzles when the pressure is applied to the nozzles of the ink jet head in the undischarged state. The higher the meniscus pressure resistance is, the more suppressed the leakage of the water-based ink from the nozzles is, wherein the recording medium and the interior of the ink-jet recording apparatus are not dirtied with the water-based ink, which is preferred. The meniscus pressure resistance is affected by not only the viscosity and the surface tension of the water-based ink but also the ink composition. The characteristic of the high meniscus pressure resistance is the basic and essential characteristic of the water-based ink for ink-jet recording. The water-based ink of the present teaching is satisfactory in the discharge stability obtained when the head is maintained in the uncapped state and the drying performance on paper surface as described above, and it is possible to suppress the compound originating from the rubber member or the like from being eluted into the water-based ink. Further, the water-based ink of the present teaching also has the high meniscus pressure resistance. The weight ratio (X:Y) is preferably X:Y=70:30 to 85:15, and more preferably X:Y=75:25 to 80:20. The total blending amount (X+Y) is preferably X+Y=2% by weight to 8% by weight, and more preferably X+Y=2% by weight to 5% by weight.

The water-based ink of the present teaching may include any penetrant other than tetra-PB and penta-PB within a range in which the effect of the present teaching is provided.

The water-based ink of the present teaching may further comprise a humectant. It is preferable to contain, as the humectant, glycerol and at least one alkylene glycol (hereinafter referred to as "alkylene glycol compound" in some cases) selected from the group consisting of ethylene glycol, diethylene glycol, and triethylene glycol. The water-based ink of the present teaching, which contains glycerol and the alkylene glycol compound as described above, is more excellent in the discharge stability provided when the head is maintained in the uncapped state, as compared with any water-based ink which does not contains the compounds as described above. The water-based ink of the present teaching, which contains glycerol, is excellent in the flashing restoration performance in relation to the nozzles of the ink-jet head. The "flashing restoration performance" is evaluated by the discharge amount of the water-based ink discharged by the flashing required for the restoration to obtain the normal discharge state after the undischarge is continued for a certain period of time (for example, for not less than 24 hours). It is affirmed that the smaller the discharge amount is, the more excellent the flashing restoration performance is.

The blending amount of glycerol with respect to the total amount of the water-based ink is not specifically limited. However, the blending amount is, for example, 1% by weight to 40% by weight, preferably 2% by weight to 30% by weight, and more preferably 4% by weight to 26% by weight. The blending amount of the alkylene glycol compound with respect to the total amount of the water-based ink is not specifically limited. However, the blending amount is, for example, 1% by weight to 40% by weight, preferably 1% by weight to 30% by weight, and more preferably 2% by weight to 20% by weight. The total blending amount of glycerol and the alkylene glycol compound with respect to the total amount of the water-based ink is not specifically limited. However, the total blending amount is, for example, 1% by weight to 50% by weight, preferably 10% by weight to 40% by weight, and more preferably 20% by weight to 30% by weight.

The water-based ink of the present teaching may contain any humectant other than glycerol and the alkylene glycol compound described above. The humectant as described above is exemplified, for example, by tetraethylene glycol, 1,3-propanediol, 1,4-butanediol, and 1,5-pentanediol.

The water-based ink of the present teaching may further contain another humectant. The humectant described above is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyhydric alcohols such as polyalkylene glycols and alkylene glycols; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, propylene glycol, butylene glycol, dipropylene glycol, tripropylene glycol, thiodiglycol, and hexylene glycol. One type of the humectant as described above may be used singly, or two or more types of the humectants as described above may be used in combination.

The blending amount of the humectant with respect to the total amount of the water-based ink is, for example, 0% by weight to 95% by weight, preferably 5% by weight to 80% by weight, and more preferably 5% by weight to 50% by weight.

The water-based ink may further contain conventionally known additives, if necessary. The additive includes, for example, surfactants, pH-adjusting agents, viscosity-adjusting agents, surface tension-adjusting agents, and fungicides. The viscosity-adjusting agent includes, for example, polyvinyl alcohol, cellulose, and water-soluble resin.

The water-based ink can be prepared, for example, such that the colorant, water, tetra-PB, penta-PB, and optionally other additive components are mixed uniformly or homogeneously by any conventionally known method, and undissolved matters are removed by a filter or the like.

In the water-based ink for ink-jet recording of the present teaching as explained above, tetra-PB and penta-PB are used as the penetrants at the specified weight ratio described above and at the specified ratio with respect to the total amount of the water-based ink described above. Therefore, the water-based ink for ink jet recording of the present teaching is excellent in the discharge stability obtained when the head is maintained in the uncapped state and the drying performance on paper surface. Further, the compound, which originates, for example, from the rubber member included in the ink jet recording apparatus, is also suppressed from being eluted into the water-based ink. Further, in the case of the ink of the present teaching which contains, as the humectants, glycerol and at least one alkylene glycol compound selected from the group consisting of ethylene glycol, diethylene glycol, and triethylene glycol, the discharge stability obtained when the head is maintained in the uncapped state is especially further improved.

Next, the ink cartridge of the present teaching will be explained. The ink cartridge of the present teaching resides in an ink cartridge including a water-based ink for ink jet recording, wherein the water-based ink is the water-based ink for ink jet recording of the present teaching. For example, a conventionally known main body can be used as a main body of the ink cartridge.

Next, the water-based ink set for ink jet recording of the present teaching (hereinafter referred to as "water-based ink set" or "ink set" in some cases) will be explained. The water-based ink set for ink jet recording contains the water-based ink for ink-jet recording described above and the treatment solution (process liquid).

At first, the treatment solution will be explained. The treatment solution contains an aggregating agent, water, and a penetrant. The treatment solution may contain another component other than the aggregating agent, water, and the penetrant.

The aggregating agent causes the colorant contained in the water-based ink to aggregate when the water-based ink and the treatment solution are brought in contact with each other on the recording medium. The aggregating agent is exemplified, for example, by a polyvalent metal salt, a cationic polymer, and a cationic surfactant.

The polyvalent metal salt described above is exemplified, for example, by aluminum chloride, aluminum bromide, aluminum sulfate, aluminum nitrate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, stannum sulfate, titanium chloride, zinc chloride, zinc bromide, zinc sulfate, zinc nitrate, zinc thiocyanate, and zinc acetate. Among them, it is preferable to use polyvalent metal salts of calcium and magnesium. In view of the degree of aggregation of the colorant, it is preferable to use a divalent metal salt.

The cationic polymer described above is exemplified, for example, by polyamine, polyallylamine, polyethyleneimine, polyvinylamine, polyvinylpyridine, polyethyleneimine-epichlorohydrin reaction product, polyamide-polyamine resin, polyamide-epichlorohydrin resin, cationic starch, polyvinyl alcohol, polyvinylpyrrolidone, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-$SO_2$ copolymer, dimethyldiallylammonium chloride polymer, and derivatives thereof. Further, the cationic polymer described above is also exemplified, for example, by a polymer of single monomer or a copolymer of a plurality of monomers composed of at least one of water-soluble monomers including, for example, dimethylaminoethyl methacrylate (DM), methacryloxyethyl trimethyl ammonium chloride (DMC), methacryloxyethyl benzyl dimethyl ammonium chloride (DMBC), dimethylaminoethyl acrylate (DA), acryloyloxyethyl trimethyl ammonium chloride (DMQ), acryloyloxyethyl benzyl dimethyl ammonium chloride (DABC), dimethylaminopropyl acrylamide (DMAPAA), and acrylamide propyl trimethyl ammonium chloride (DMAPAAQ). Among them, it is preferable to use polyamine, polyallylamine, and polyethyleneimine.

The cationic surfactant described above is exemplified, for example, by primary, secondary, and tertiary amine salt type compounds, alkylamine salt, dialkylamine salt, aliphatic amine salt, benzalkonium salt, quaternary ammonium salt, quaternary alkylammonium salt, alkylpyridinium salt, imidazolinium salt, sulfonium salt, phosphonium salt, and onium salt. Specifically, it is possible to exemplify, for example, hydrochloride and acetate of, for example, laurylamine, coco amine, and rosin amine, lauryl trimethyl ammonium chloride, cetyl trimethyl ammonium chloride, benzyl tributyl ammonium chloride, benzalkonium chloride, dimethyl ethyl lauryl ammonium ethylsulfate, dimethyl ethyl octyl ammonium ethylsulfate, trimethyl lauryl ammonium hydrochloride, cetyl pyridinium chloride, cetyl pyridinium bromide, dihydroxyethyllaurylamine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride. Among them, it is preferable to use dimethyl ethyl lauryl ammonium ethylsulfate, dimethyl ethyl octyl ammonium ethylsulfate, trimethyl lauryl ammonium hydrochloride, dodecyl dimethyl ammonium chloride, and tetradecyl dimethyl ammonium chloride.

The blending amount of the aggregating agent with respect to the total amount of the treatment solution is not specifically limited. For example, in the case of the polyvalent metal salt, the blending amount is, for example, 1% by weight to 30% by weight, and preferably 5% by weight to 25% by weight. For example, in the case of the cationic polymer, the blending amount is, for example, 0.1% by weight to 15% by weight, and preferably 1% by weight to 10% by weight. For example, in the case of the cationic surfactant, the blending amount is, for example, 1% by weight to 30% by weight, and preferably 4% by weight to 25% by weight. One aggregating agent as described above may be used singly. Alternatively two or more of the aggregating agents described above may be used in combination.

It is preferable that water to be used for the treatment solution is ion exchange water or pure water. The blending amount of water with respect to the total amount of the treatment solution may be, for example, the balance of the other components.

The penetrant includes triethylene glycol monobutyl ether (tri-PB). In the water-based ink set of the present teaching, tetra-PB and penta-PB are used as the penetrants for the water-based ink at the specified weight ratio and at the specified ratio with respect to the total amount of the water-based ink as described above, and tri-PB is used as the penetrant for the treatment solution as described above. Therefore, when the water-based ink and the treatment solution are used in combination, the optical density (DO value) of the recorded matter is further improved as compared with any water-based ink set based on the use of a treatment solution blended with only any conventional aggregating agent, while suppressing the decrease in the drying performance on paper surface. The blending amount of tri-PB with respect to the total amount of the treatment solution is not specifically limited. However, the blending amount is preferably 1% by weight to 10% by weight.

The treatment solution may contain any penetrant other than tri-PB.

The treatment solution may further contain a humectant. The humectant and the blending amount thereof are the same as the humectant and the blending amount thereof in relation to the water-based ink described above.

The treatment solution may further contain any conventionally known additive, if necessary. The additive is the same as the additive in relation to the water-based ink described above.

The treatment solution can be prepared, for example, by mixing the aggregating agent, water, tri-PB, and optionally other additive components uniformly or homogeneously in accordance with any conventionally known method.

The water-based ink set of the present teaching can be also provided as an ink cartridge. For example, the ink cartridge of the present teaching has an ink accommodating section and a treatment solution accommodating section. The water-based ink of the present teaching is accommodated in the ink accommodating section, and the treatment solution of the present teaching is accommodated in the treatment solution accommodating section. The ink cartridge of the present teaching may have an accommodating section for any water-based ink other than the water-based ink of the present teaching.

The ink cartridge of the present teaching may be an ink cartridge assembly in which the water-based ink cartridge and the treatment solution cartridge, which are formed distinctly and independently, are assembled or collected. Alternatively, the ink cartridge of the present teaching may be an integrated type ink cartridge in which the interior thereof is comparted to form the ink accommodating section and the treatment solution accommodating section. For example, any conventionally known main body can be used as the main body of the ink cartridge of the present teaching.

In the water-based ink set for ink-jet recording of the present teaching as explained above, tetra-PB and penta-PB are used as the penetrants for the water-based ink at the specified weight ratio and at the specified ratio with respect to the total amount of the water-based ink as described above, and tri-PB is used as the penetrant for the treatment solution as described above. Therefore, the optical density (OD value) of the recorded matter is further improved as compared with any water-based ink set based on the use of a treatment solution blended with only any conventional aggregating agent, while suppressing the decrease in the drying performance on paper surface.

Further, in the water-based ink set for ink-jet recording of the present teaching, it is preferable that the water-based ink contains, as the humectants, glycerol and at least one alkylene glycol compound selected from the group consisting of ethylene glycol, diethylene glycol, and triethylene glycol. The water-based ink of the ink set of the present teaching, which contains glycerol and the alkylene glycol compound described above, is more excellent in the discharge stability obtained when the head is maintained in the uncapped state, as compared with any water-based ink which does not contain them. Further, the water-based ink of the ink set of the present teaching, which contains glycerol, is excellent in the flashing restoration performance in relation to the nozzles of the ink-jet head.

Next, an explanation will be made about an ink-jet recording method and an ink-jet recording apparatus according to the present teaching.

The ink-jet recording method according to the present teaching resides in an ink-jet recording method for performing recording by discharging a water-based ink onto a recording medium in accordance with an ink-jet system, wherein the water-based ink for ink-jet recording of the present teaching is used as the water-based ink.

The ink-jet recording method of the present teaching may further comprise a step of applying the treatment solution to the recording medium. That is, the ink-jet recording method according to the present teaching resides in an ink-jet recording method for performing recording by using a water-based ink set for ink-jet recording including a water-based ink for ink-jet recording and a treatment solution, the ink-jet recording method including a step of applying the treatment solution to a recording medium and a step of discharging the water-based ink onto the recording medium in accordance with an ink-jet system, wherein the water-based ink set for ink-jet recording of the present teaching is used as the water-based ink set.

The ink jet recording method of the present teaching can be carried out, for example, by using the ink jet recording apparatus of the present teaching. The recording includes, for example, the printing of letters, the printing of images, and the printing.

The ink-jet recording apparatus according to the present teaching resides in an ink jet recording apparatus including an ink accommodating section and an ink discharge mechanism, for discharging an ink accommodated in the ink accommodating section by the ink discharge mechanism, wherein the water-based ink for ink-jet recording of the present teaching is accommodated in the ink accommodating section.

The ink-jet recording apparatus of the present teaching may be, for example, an ink jet recording apparatus of the line type on which a line type ink-jet head is carried or an ink jet recording apparatus of the serial type on which a serial type ink-jet head is carried. The line type ink-jet recording apparatus is such an ink-jet recording apparatus that the line type ink-jet head, which has a recording width of not less than the width of the recording medium, is used, and the recording can be collectively performed in the widthwise direction of the recording medium in a state in which the line type ink jet head is fixed. On the contrary, in the case of the serial type ink jet recording apparatus, the recording is performed while moving the serial type ink-jet head itself in the widthwise direction of the recording surface of the recording medium. The line type ink jet recording apparatus has the recording speed which is extremely faster than that of the serial type ink jet recording apparatus. The water-based ink of the present teaching is excellent in the discharge stability obtained when the head is maintained in the uncapped state and the drying performance on paper surface, and the meniscus pressure resistance is also improved in relation to the nozzles of the ink-jet head. Therefore, it is preferable that the water-based ink of the present teaching is applied to the high speed recording performed by the line type ink-jet recording apparatus.

An ink-jet recording apparatus 101 shown in FIG. 1 is a line type ink jet recording apparatus on which line type ink-jet heads 2 are carried. As shown in the drawing, the line type ink jet recording apparatus 101 comprises, as main constitutive elements, four ink cartridges 1, four ink discharge mechanisms (line type ink jet heads) 2, a paper feed unit 11, a paper discharge unit 12, a belt transport mechanism 13, and a control unit (controller) 16 which controls the entire line type ink-jet recording apparatus 101. The paper feed unit 11 is arranged on one side (left side in FIG. 1) of the belt transport mechanism 13. The paper discharge unit 12 is arranged on the other side (right side in FIG. 1) of the belt transport mechanism 13.

A recording paper transport passage, in which the recording paper P is transported from the paper feed unit 11 toward the paper discharge unit 12 by the aid of the belt transport mechanism 13, is formed in the line type ink jet recording apparatus 101. The direction, in which the recording paper P is transported, is designated as the recording paper transport direction X. The paper feed unit 11 includes a recording paper stocker 11a and a pickup roller 11c. The recording paper stocker 11a accommodates the sheets of the recording paper P therein in a stacked state, which has an opening formed at the upper surface thereof. The recording paper stocker 11a is arranged in a state of being inclined toward the downstream side in the recording paper transport direction X (right side in FIG. 1, hereinafter referred to as "downstream side"). A support plate 11b, which is urged by a spring 11d in the direction directed from the bottom surface toward the upper opening, is arranged in the recording paper stocker 11a. The recording paper P is stacked on the support plate 11b. The pickup roller 11c is driven by a placement motor (not shown). Accordingly, the sheets of the recording paper P, which are stacked in the recording paper stocker 11a, are picked up (taken out) one by one from the top, and the picked up recording paper P is fed to the downstream side. A recording paper detection sensor 59 is arranged just downstream from the paper feed unit 11. The recording paper detection sensor 59 is provided to detect whether or not the fed recording paper P arrives at the recording waiting position A positioned just upstream (on the left side in FIG. 1) in the recording paper transport direction X from the belt transport mechanism 13. The adjustment is made so that the end portion on the downstream side of the recording paper P disposed at the recording waiting position A can be detected. The fed recording paper P passes through the recording waiting position A, and the recording paper P is transported to the belt transport mechanism 13.

The belt transport mechanism 13 includes two belt rollers 6, 7, a transport belt 8, a platen 15, and a transport motor (not shown). The transport belt 8 is an endless belt which is wound around so that the transport belt 8 is applied between the two belt rollers 6, 7. The outer surface of the transport belt 8 is designated as an outer circumferential surface 8a. The platen 15 is arranged at the position opposed to the four line type ink-jet heads 2 as described later on in the area surrounded by the transport belt 8. The platen 15 supports the transport belt 8 so that the transport belt 8 is not flexibly bent downwardly in the area opposed to the four line type ink-jet heads 2. A nip roller 4 is arranged at the position opposed to the belt roller 7. The nip roller 4 presses the recording paper P against the outer circumferential surface 8a when the recording paper P, which is transported to the belt transport mechanism 13, is placed on the outer circumferential surface 8a. When the transport motor rotates the belt roller 6, the transport belt 8 is driven (rotated). Accordingly, the transport belt 8 transports the pressed recording paper P toward the paper discharge unit 12, while adhesively holding the pressed recording paper P. An exfoliating mechanism 14 is provided just downstream from the transport belt 8. The exfoliating mechanism 14 is constructed such that the recording paper P, which is adhesively stuck to the outer circumferential surface 8a, is exfoliated from the outer circumferential surface 8a, and the recording paper P is fed toward the paper discharge unit 12.

Each of the four ink cartridges 1 includes each of four color water-based inks of yellow, magenta, cyan, and black one by one. At least one of the four color water-based inks is the water-based ink of the present teaching, or all of the four color water-based inks may be the water-based inks of the present teaching. Any general water-based ink may be used as the water-based ink other than the water-based ink of the present teaching. The four ink cartridges 1 are aligned and fixed over or above the belt transport mechanism 13 in the recording paper transport direction X. The four ink cartridges 1 have the line type ink jet heads 2 disposed at the lower ends thereof respectively. The ink droplets are discharged from the ink discharge surfaces 2a toward the recording area of the recording paper P when the recording paper P, which is transported by the transport belt 8, successively passes just under the four line type ink-jet heads 2. Accordingly, a desired image can be formed on the recording area of the recording paper P. The water-based ink of the present teaching is excellent in the discharge stability obtained when the head is maintained in the uncapped state, i.e., the stability of discharge from the line type ink jet head 2, and the water-based ink of the present teaching is excellent in the drying performance on paper surface. The ink jet recording apparatus of the present teaching may have a maintenance mechanism which includes any rubber member including, for example, a wiper for wiping the nozzle surface of the line type ink-jet head 2 and a cap for shutting off the nozzle surface from the external environment. In the case of the water-based ink of the present teaching, the compound, which originates from the rubber member of the maintenance mechanism as described above, is suppressed from being eluted into the water-based ink. Further, the water-based ink of the present teaching is also excellent in the meniscus pressure resistance at the nozzles of the line type ink-jet head 2.

Figure 2:
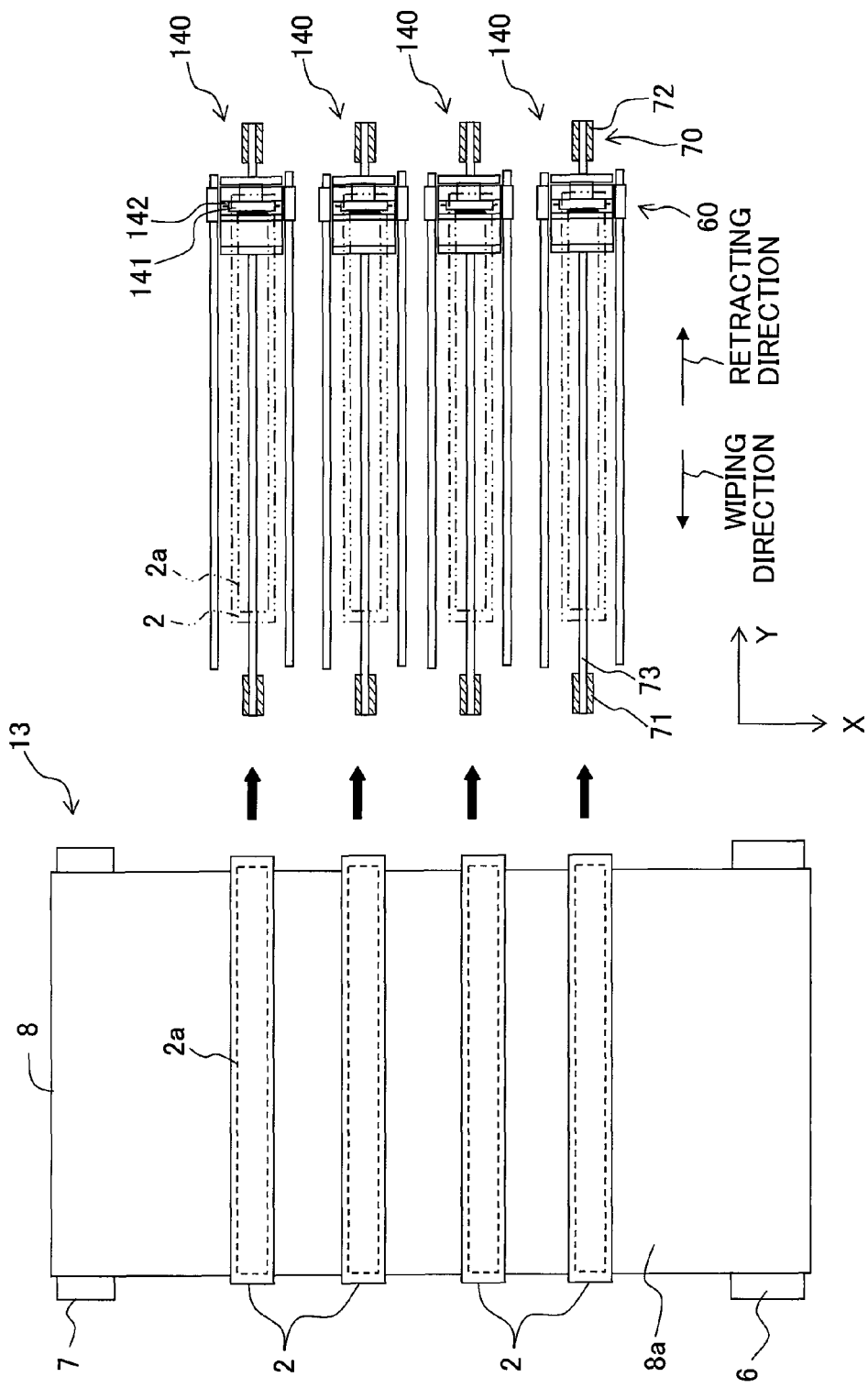
FIG. 2 shows a partial plan view illustrating a printer shown in FIG. 1, depicting wipe units corresponding to respective ink-jet heads.
Figure 3:
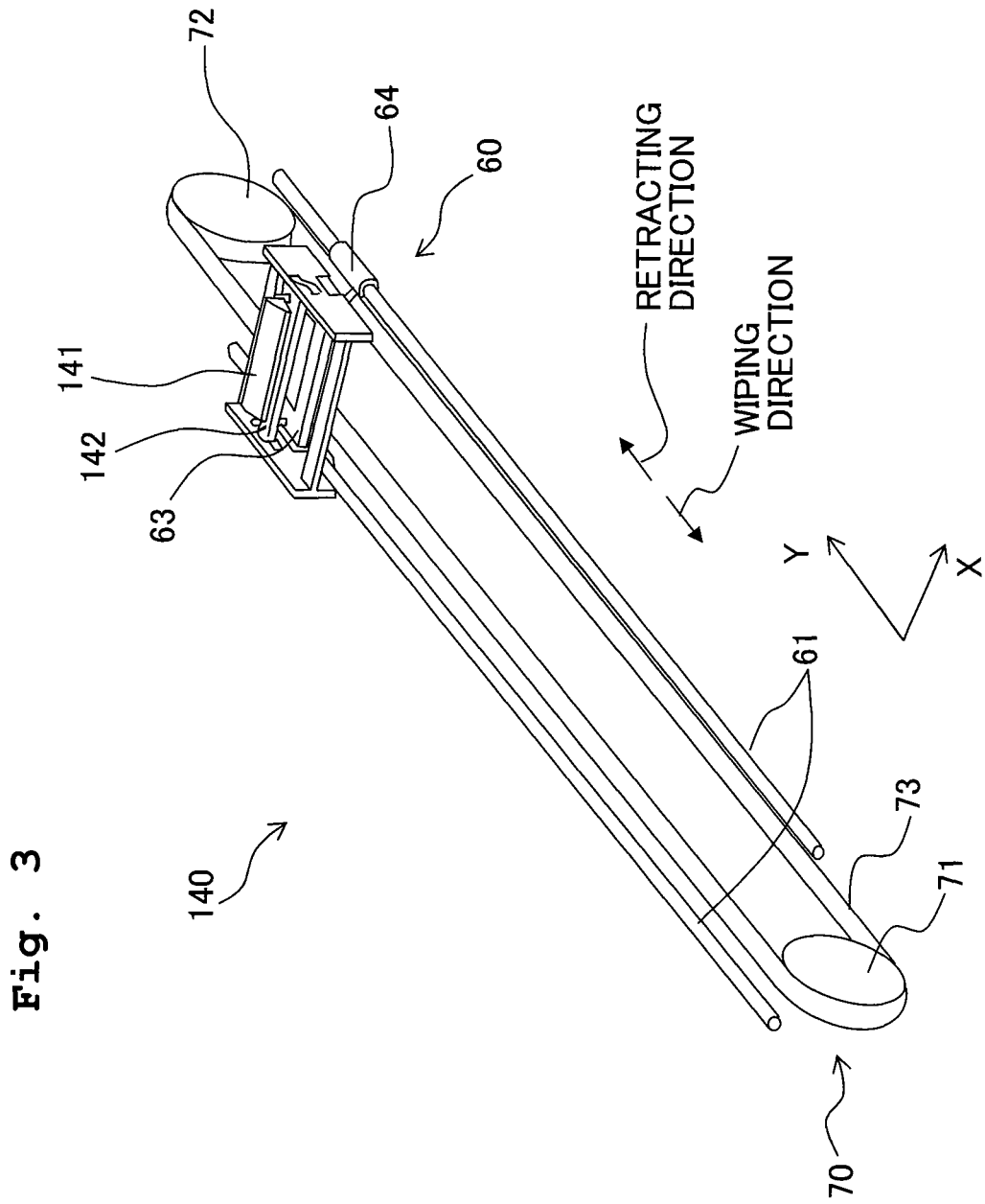
FIG. 3 shows a perspective view illustrating the wipe unit shown in FIG. 2.
Figure 4:
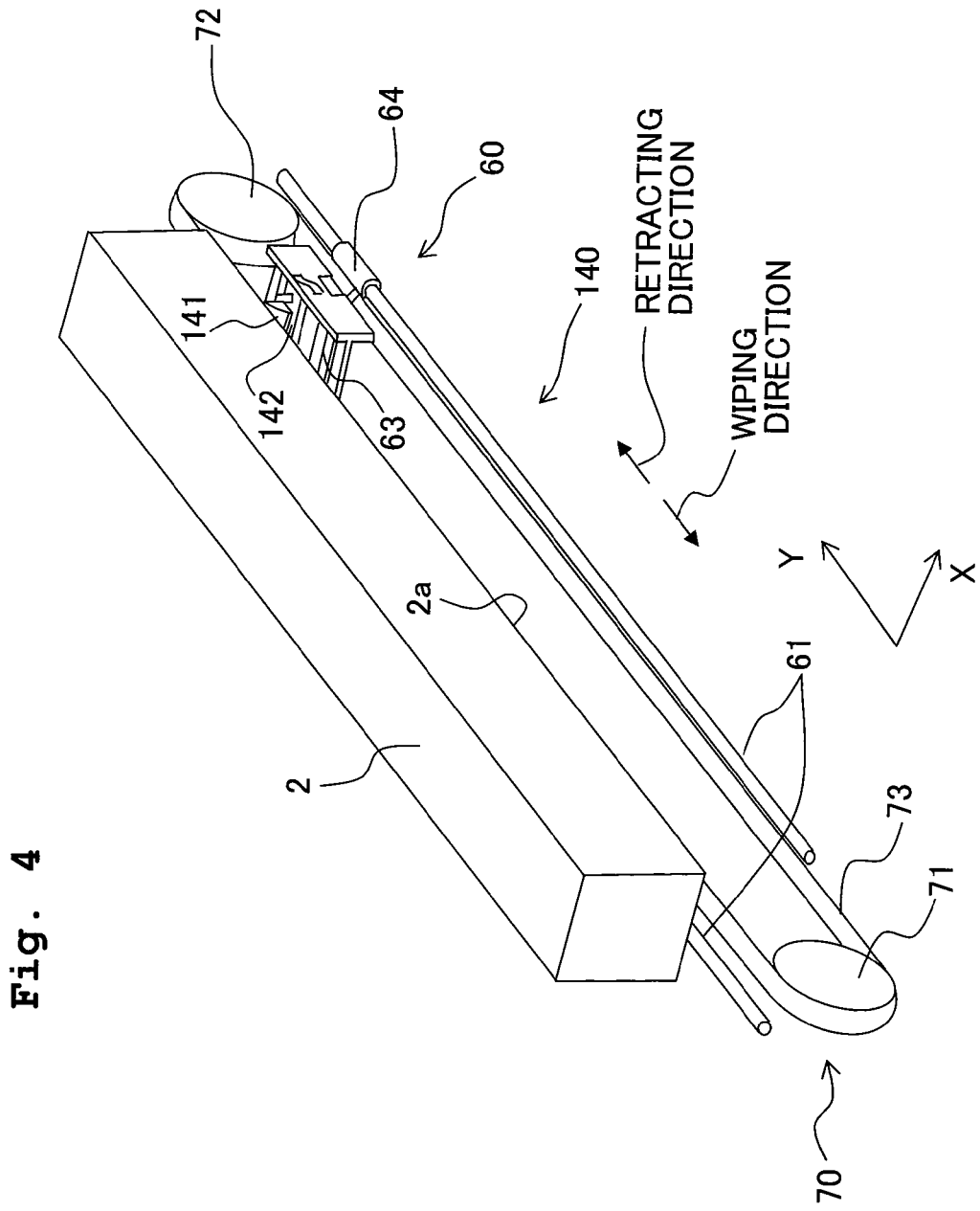
FIG. 4 shows a perspective view illustrating a situation in which the head is arranged over or above the wipe unit shown in FIG. 3 and the wiping is performed by a wiper.

The maintenance mechanism of the line type ink-jet head is exemplified, for example, by a wipe unit which wipes out the nozzle surface as disclosed in United States Patent Publication No. 2011/0205295. United States Patent Publication No. 2011/0205295 is incorporated herein by reference. An explanation will be made below about a wiper and a wipe unit for wiping the ink discharge surface 2a of the line type ink jet head 2. In FIGS. 2 to 4, the direction, which is perpendicular to the "recording paper transport direction X" as the direction in which the recording paper P is transported as described above and which is parallel to the direction in which the line head 2 extends, is defined as "wiper scanning direction Y" which is shown in the drawings.

As the time elapses, the foreign matters (for example, ink, paper powder, and dust) adhere to the ink discharge surface 2a. Further, the increase in viscosity of the ink advances in the discharge port from which the discharge is performed a small number of times. Any one of the phenomenon is the factor to deteriorate the discharge performance of the ink. Therefore, the controller 16 performs the process (maintenance) for restoring the discharge performance every time when a predetermined period of time elapses or every time when a predetermined number of recording paper sheets are subjected to the recording. The maintenance refers to, for example, the purge operation in which the ink is forcibly discharged from the discharge port and the wiping operation in which the foreign matter (for example, the ink) is wiped out from the ink discharge surface 2a by a wiper 141 shown in FIGS. 2 to 4 after the purge operation.

As shown in FIG. 2, the wipe unit 140 is provided for each of the four heads 2. The four wipe units 140 are juxtaposed and arranged in the recording paper transport direction X at the same intervals as the arrangement pitches of the heads 2 on the side of the belt transport mechanism 13 shown in FIG. 1.

As shown in FIGS. 3 and 4, the wipe unit 140 has the wiper 141, a wiper holder 142, a guide mechanism 60, and a movement mechanism 70. The wiping of the ink discharge surface 2a, which is performed by the wiper 141, is executed, for example, after the purge operation under the control performed by the controller 16.

The wiper 141 has a form of column or prism of substantially right-angled triangle extending in the recording paper transport direction X, and the wiper 141 is arranged while disposing the right-angled portion on the lower side. The wiper 141 has substantially the same length as that of the discharge surface 2a in the recording paper transport direction X. The wiper holder 142 is composed of a horizontal plate-shaped member for fixing the wiper 141. The wiper 141 is fixed to the central portion of the upper surface of the wiper holder 142.

As shown in FIGS. 3 and 4, the guide mechanism 60 has two parallel shafts 61 and a horizontal plate-shaped member (support member) 63. The shafts 61 are rod-shaped members extending in the wiper scanning direction Y. Sliding portions 64 are formed at both end portions of the plate-shaped member 63 in the recording paper transport direction X. The plate-shaped member 63 is supported slidably in the wiper scanning direction Y along the shafts 61 by the aid of the sliding portions 64. Further, the wiper 141 and the wiper holder 142 described above are held by the plate-shaped member 63. Accordingly, the wiper 141 and the wiper holder 142 are also slidable in the wiper scanning direction Y along the shafts 61 together with the plate-shaped member 63.

As shown in FIGS. 2 to 4, the movement mechanism 70 has two pulleys 71, 72 which are arranged while being separated from each other in the wiper scanning direction Y, and a belt 73 which is applied to span the pulleys 71, 72. The pulley 72 is a driving pulley which is rotated in accordance with the driving a driving motor (not shown) under the control performed by the controller 16. When the pulley 72 is rotated forwardly, the belt 73 is moved in the wiping direction as shown in FIGS. 2 to 4. In this situation, for example, the wiper 141 and the wiper holder 142 are also moved in the wiping direction along the shafts 61. When the pulley 72 is rotated reversely, the belt 73 is moved in the retracting direction opposite to the wiping direction. In this situation, the wiper 141 and the wiper holder 142 are also moved in the retracting direction along the shafts 61. Both of the wiping direction and the retracting direction are the directions parallel to the wiper scanning direction Y. Further, the pulley 71 is a driven pulley which is rotated in accordance with the travel of the belt 73.

Next, an explanation will be made about the operation of the respective portions of the wipe unit 40 for wiping out the discharge surface 2a of the head 2.

For example, when the purge operation of the head 2 is completed and the wiping with the wiper 141 is instructed under the control performed by the controller 16, then the wipe unit 40 proceeds to the wiping mode. In this situation, the driving of the respective portions is stopped in the entire transport passage. The respective heads 2 are moved in the wiper scanning direction Y as indicated by thick arrows in FIG. 2 by the head movement mechanism (not shown) under the control performed by the controller 16. Accordingly, the heads 2 are moved from the recording positions (positions indicated by solid lines in FIG. 2, positions opposed to the transport belt 8 in relation to the vertical direction) to the maintenance positions (positions indicated by alternate long and short dash lines in FIG. 2, see FIG. 4).

The pulley 72 is rotated forwardly and the belt 73 travels under the control performed by the controller 16. For example, the wiper 141, the wiper holder 142, and the guide mechanism 60 are moved in the wiping direction along the shafts 61.

When the wiper 141 arrives at the position opposed to the discharge surface 2a, the wiper 141 abuts against the discharge surface 2a. After that, the wiper 141 is moved in the wiping direction while abutting against the discharge surface 2a, and the wiper 141 can wipe out the foreign matters from the discharge surface 2a.

Further, for example, the wiper 141, the wiper holder 142, and the guide mechanism 60 are moved to the wiping end positions (positions nearest to the belt transport mechanism 13 in the movement range in the wiper scanning direction Y), and thus the wiping of the discharge surface 10a by the wiper 141 is completed.

The wiper 141 is a rubber member which is formed of an elastic material such as rubber or the like. The water-based ink of the present teaching is used in this ink jet recording apparatus. Therefore, as described above, it is possible to suppress the compound originating from the rubber member or the like used for the wiper from being eluted into the water-based ink.

The material, which is used, for example, for the wiper 141, is exemplified, for example, by ethylene-propylene-diene rubber polymer (EPDM), isobutylene-isoprene rubber polymer (IIR), isoprene rubber polymer (IR), butadiene rubber polymer (BR), silicone rubber polymer (Q), and chloroprene rubber polymer (CR). The ink of the present teaching especially suppresses the elution of the substance originating from the rubber member when the rubber member such as the wiper or the like is composed of ethylene-propylene-diene rubber polymer (EPDM). Therefore, the ink of the present teaching can be used especially preferably in the ink jet recording apparatus in which the rubber member such as the wiper or the like of the head maintenance mechanism is formed of ethylene-propylene-diene rubber polymer. Any commercially available product can be used as ethylene-propylene-diene rubber polymer (EPDM). It is possible to exemplify, for example, EP 331 produced by JSR and Esprene (trade name) 505 produced by Sumitomo Chemical Co., Ltd. The component, which is feared to be eluted into the ink from the material as described above, is exemplified, for example, by zinc ion, iron ion, copper ion, and sodium ion originating from a vulcanizing agent or a vulcanization facilitating agent; and calcium ion, zinc ion, magnesium ion, and lead ion originating from a lubricant.

In the case of the ink jet recording apparatus shown in FIGS. 1 to 4, the maintenance mechanism for the head is exemplified by the wiper formed of the elastic material such as rubber or the like. However, the ink jet recording apparatus of the present teaching may have any other maintenance mechanism including the rubber member, for example, a cap or the like for covering the nozzles of the ink-jet head, together with the wiper or in place of the wiper. Even in the case of those other than the maintenance mechanism, it is also allowable to include any rubber member at the portion which is brought in contact with the water-based ink, including, for example, a seal packing which is applied to a joined portion between parts and a tube which supplies the ink from an ink tank to the ink jet head when the ink tank is provided distinctly from the ink-jet head. The water-based ink of the present teaching is used in the ink-jet recording apparatus of the present teaching. Therefore, as described above, it is possible to suppress the component originating from the rubber member as described above from being eluted into the water-based ink.

The apparatus shown in FIGS. 1 to 4 adopts the line type ink-jet head. However, the present teaching is not limited thereto. The ink jet recording apparatus as described above may be an apparatus which adopts a serial type ink jet head.

The ink-jet recording apparatus of the present teaching may further comprise a treatment solution applying mechanism. That is, the ink jet recording apparatus of the present teaching resides in an ink jet recording apparatus including an ink set accommodating section, a treatment solution applying mechanism, and an ink discharge mechanism, wherein the water-based ink set for ink jet recording of the present teaching is accommodated in the ink set accommodating section, the treatment solution, which constitutes the water-based ink set, is applied to a recording medium by the treatment solution applying mechanism, and the water-based ink, which constitutes the water-based ink set, is discharged onto the recording medium by the ink discharge mechanism.

Figure 5:
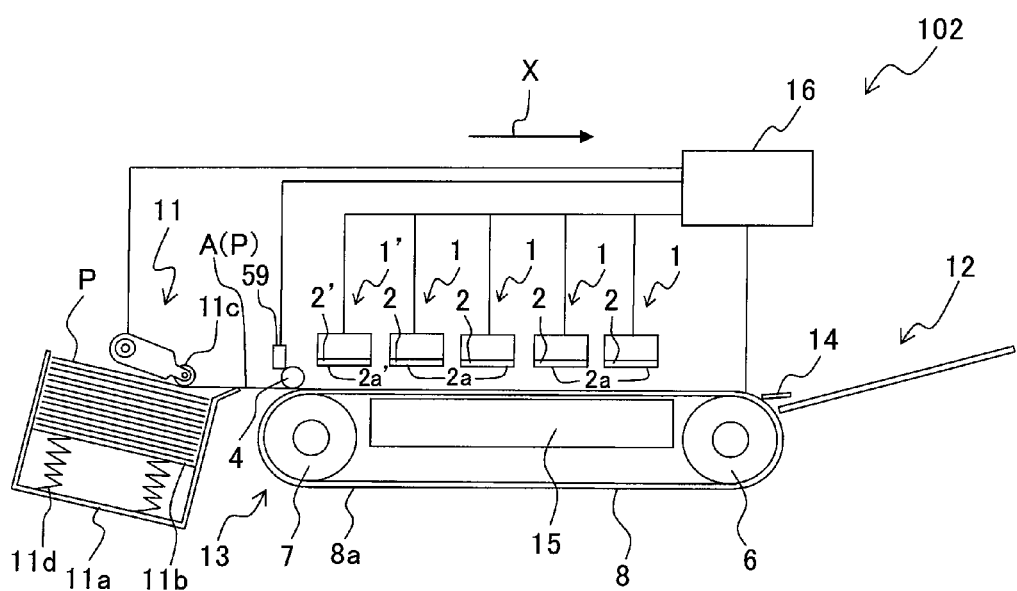
FIG. 5 schematically shows an exemplary ink-jet recording apparatus having a treatment solution applying mechanism according to the present teaching.

An ink-jet recording apparatus 102 shown in FIG. 5 is an example of the ink-jet recording apparatus having the treatment solution applying mechanism. In FIG. 5, the portions, which are the same as those shown in FIG. 1, are designated by the same reference numerals. The ink jet recording apparatus 102 of this embodiment is a line type ink-jet recording apparatus including one cartridge 1' for the treatment solution, four ink cartridges 1, one treatment solution applying mechanism (line type discharge head for the treatment solution, treatment solution discharge mechanism) 2', and four ink discharge mechanisms (line type ink jet heads) 2. Therefore, the arrangement of the line type ink-jet recording apparatus 102 of this embodiment is the same as that of the apparatus shown in FIG. 1 described above except that one cartridge 1' for the treatment solution and one treatment solution applying mechanism (line type discharge head for the treatment solution) 2' are provided.

The treatment solution cartridge 1' includes the treatment solution of the present teaching. Each of the four ink cartridges 1 includes one of the four color water-based inks of yellow, magenta, cyan, and black. As for the four color water-based inks, at least one of them is the water-based ink of the present teaching, wherein all of them may be the water-based inks of the present teaching. As for the water-based ink other than the water-based ink of the present teaching, it is allowable to use any general water-based ink. At first, the treatment solution of the present teaching is discharged from the treatment solution discharge surface 2a' toward the recording surface of the recording paper P when the recording paper P, which is transported by the transport belt 8, passes just under or below the line type treatment solution discharge head 2'.

Figure 7A:
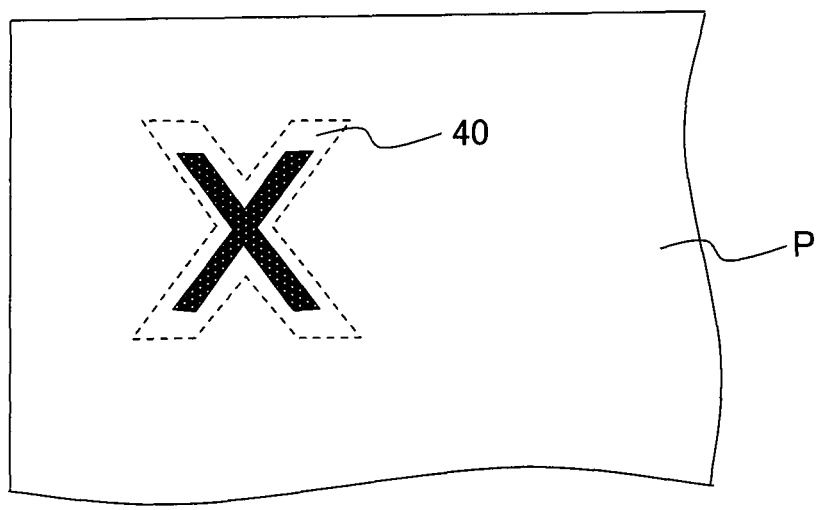
FIGS. 7A and 7B show examples of the recording each of which is performed in accordance with an ink jet recording method according to the present teaching.
Figure 7B:
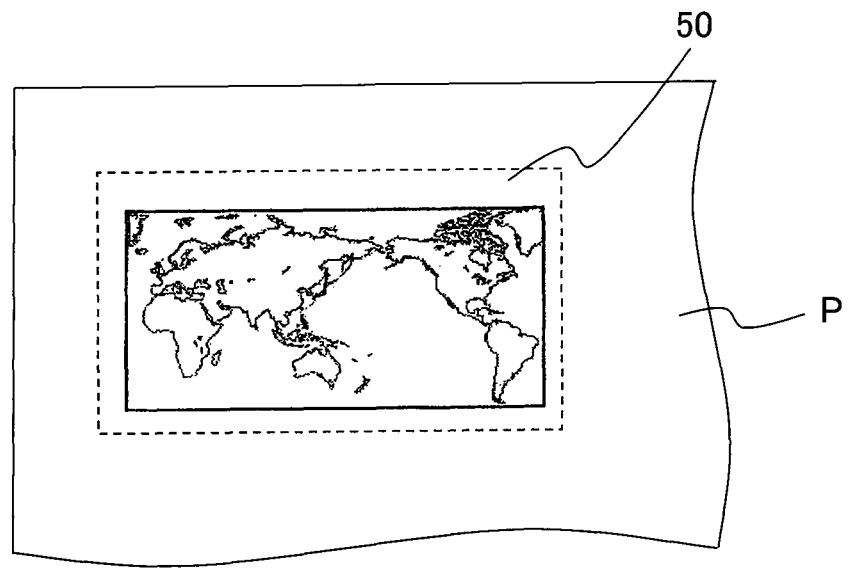

The treatment solution may be discharged to the entire recording surface of the recording paper P, or the treatment solution may be discharged to a part of the recording surface of the recording paper P. When the treatment solution is discharged to a part of the recording surface of the recording paper P, the discharge portion is at least the recording area of the recording surface of the recording paper P subjected to the recording with the water-based ink. When the treatment solution is discharged to a part of the recording surface of the recording paper P, it is preferable that the size of the discharge portion is larger than that of the recording area. For example, as shown in FIG. 7A, when a letter (X) is recorded on the recording paper P, it is preferable that the treatment solution is discharged so that a discharge portion 40 is formed with a line width larger than the line width of the letter. On the other hand, as shown in FIG. 7B, when a pattern is formed on the recording paper P, it is preferable that the treatment solution is discharged so that a discharge portion 50, which is larger than the pattern, is formed.

Subsequently, the ink droplets are discharged from the ink discharge surface 2a toward the recording area of the recording paper P when the recording paper P, which is transported by the transport belt 8, successively passes just under or below the four line type ink jet heads 2. Accordingly, it is possible to form a desired image in the recording area of the recording paper P. In the case of the water-based ink set of the present teaching, the optical density (OD value) of the recorded matter is further improved as compared with any water-based ink set based on the use of a treatment solution blended with only any conventional aggregating agent, while suppressing the drying performance on paper surface from being lowered or deteriorated. Further, the water-based ink set of the present teaching also improves the discharge stability of the water-based ink provided when the line type ink-jet head is maintained in the uncapped state and the meniscus pressure resistance provided in relation to the nozzles of the line type ink-jet head.

Figure 6:
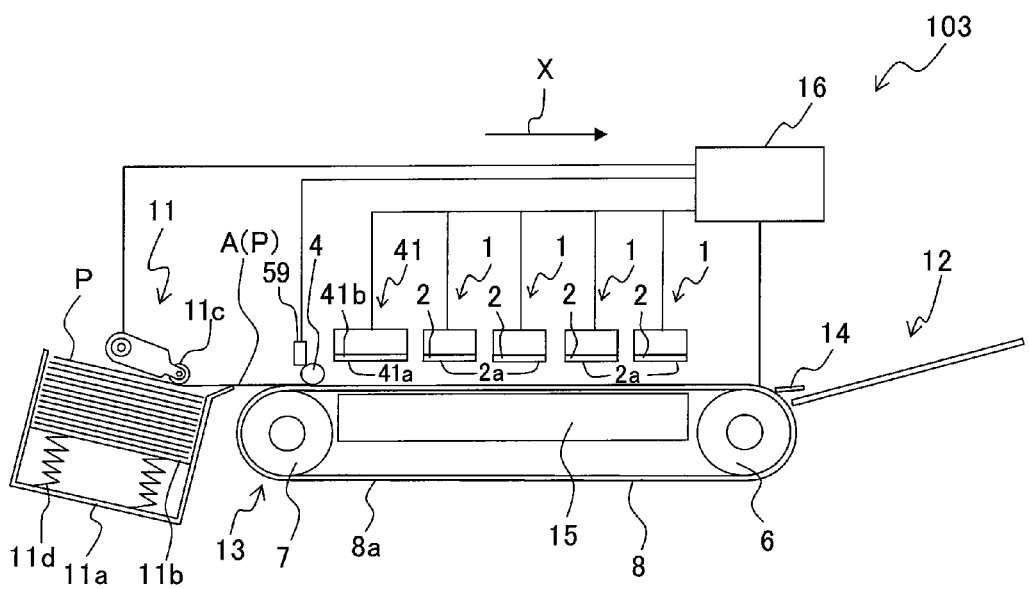
FIG. 6 schematically shows another exemplary ink-jet recording apparatus having a treatment solution applying mechanism according to the present teaching.

Next, an explanation will be made about another example of the ink jet recording apparatus having the treatment solution applying mechanism. An ink-jet recording apparatus 103 shown in FIG. 6 is a line type ink-jet recording apparatus constructed such that the line type ink jet heads 2 are carried, and the treatment solution of the present teaching is applied to the recording surface of the recording paper P by the stamp coating. Therefore, the line type ink jet recording apparatus 103 of this embodiment has no applying mechanism for applying the treatment solution based on the ink jet system (the treatment solution cartridge 1', the line type treatment solution discharge head 2', and the treatment solution discharge surface 2a' shown in FIG. 5). Other than the above, the line type ink-jet recording apparatus 103 of this embodiment is constructed in the same manner as the apparatus shown in FIG. 5 described above. In FIG. 6, the components or parts, which are the same as those shown in FIGS. 1 and 5, are designated by the same reference numerals.

As shown in FIG. 6, in the case of the line type ink-jet recording apparatus 103 of this embodiment, a stamp 41 (treatment solution coating mechanism) is arranged at the position of the treatment solution cartridge 1', the line type treatment solution discharge head 2', and the treatment solution discharge surface 2a' shown in FIG. 5. The stamp 41 includes a stamp section 41a and a treatment solution accommodating section 41b. The stamp section 41a is formed of a highly liquid-absorptive base material having flexibility. When the recording is performed, then the stamp section 41a is brought in contact with the recording surface of the recording paper P, and the treatment solution of the present teaching, which is supplied from the treatment solution accommodating section 41b, is applied to the recording surface of the recording paper P. After that, a desired image is formed on the recording area of the recording paper P by using the water-based inks of the present teaching in the same manner as in the apparatus shown in FIG. 5.

It is preferable that the treatment solution of the present teaching is used as the pretreatment solution to be applied to the recording paper P prior to the discharge of the water-based ink, as in the ink jet recording method based on the use of the apparatuses shown in FIGS. 5 and 6. Accordingly, for example, it is possible to enhance the aggregation efficiency of the colorant contained in the water-based ink. However, the present teaching is not limited thereto. In the present teaching, the treatment solution may be applied after formerly discharging the water-based inks onto the recording paper P. Alternatively, it is also allowable to simultaneously perform the application of the treatment solution to the recording paper P and the discharge of the water-based inks.

In the case of the apparatuses shown in FIGS. 5 and 6, the treatment solution of the present teaching is applied to the recording surface of the recording paper P in accordance with the ink-jet system and the stamp system. However, the present teaching is not limited thereto. In the case of the ink-jet recording apparatus as described above, the treatment solution of the present teaching may be applied to the recording surface of the recording paper P in accordance with, for example, the coating with a brush or the coating with a roller. Further, it is also allowable that each of the apparatuses shown in FIGS. 5 and 6 is provided with, for example, the wiper 141 shown in FIGS. 2 to 4.

EXAMPLES

Next, Examples of the present teaching will be explained together with Comparative Examples. It is noted that the present teaching is not limited and restricted to Examples and Comparative Examples described below.

Examples 1 to 15 and Comparative Examples 1 to 22

An ink solvent was obtained by uniformly mixing components except for CAB-O-JET (trade name) 300 in a water-based ink composition (Tables 1 and 2). Subsequently, the ink solvent was added to CAB-O-JET (trade name) 300, followed by being mixed uniformly. After that, an obtained mixture was filtrated through a cellulose acetate type membrane filter (pore size: 3.00 μm) produced by Toyo Roshi Kaisha, Ltd. Thus, water-based inks for ink-jet recording of Examples 1 to 15 and Comparative Examples 1 to 22 were obtained.

In relation to the water-based inks of Examples and Comparative Examples, (a) the evaluation of the discharge stability obtained when the head was maintained in the uncapped state, (b) the evaluation of the drying performance on paper surface, (c) the evaluation of the immersion of rubber, (d) the evaluation of the meniscus pressure resistance, and (e) the overall evaluation were carried out in accordance with the following methods.

(a) Evaluation of Discharge Stability Obtained when Head was Maintained in Uncapped State The line type ink jet head was maintained for 7 seconds in an uncapped state in an environment in which the temperature was 40° C. and the relative humidity was 20% in the line type ink-jet recording apparatus on which the line type ink-jet head was carried as shown in FIG. 1. After that, five lateral ruled lines of 1 dot were recorded on the 4200 paper produced by XEROX by discharging each of the water-based inks of Examples and Comparative Examples. The discharge stability, which was obtained when the head was maintained in the uncapped state, was evaluated in accordance with the following evaluation criteria by making comparison with lateral ruled lines (Reference) formed by the continuous recording performed without maintaining the head in the uncapped state.

Evaluation Criteria for Evaluation of Discharge Stability Obtained when Head was Maintained in Uncapped State AAA: Dot recording delay and undischarge were not caused from 1st lateral ruled line, and situation was equivalent to that of Reference.

AA: Dot recording delay and undischarge were not caused from 2nd lateral ruled line, and situation was equivalent to that of Reference.

A: Dot recording delay and undischarge were not caused from 3rd lateral ruled line, and situation was equivalent to that of Reference.

B: Dot recording delay and undischarge were not caused from 4th lateral ruled line, and situation was equivalent to that of Reference.

C: Dot recording delay and undischarge were not caused from 5th lateral ruled line, and situation was equivalent to that of Reference.

(b) Evaluation of Drying Performance on Paper Surface

100% solid printing was recorded at 600 dpi on the 4200 paper produced by XEROX by discharging each of the water-based inks of Examples and Comparative Examples by using the line type ink jet recording apparatus on which the line type ink-jet head was carried as shown in FIG. 1. The time, which elapsed until the water-based ink disappeared on the paper surface after the recording of solid printing, was measured to evaluate the drying performance on paper surface in accordance with the following evaluation criteria.

Evaluation Criteria for Evaluation of Drying Performance on Paper Surface

AA: Water-based ink disappeared from paper surface within 3 seconds.

A: Water-based ink disappeared from paper surface within 5 seconds while exceeding 3 seconds.

B: Water-based ink disappeared from paper surface within 10 seconds while exceeding 5 seconds.

C: Water-based ink disappeared from paper surface after exceeding 10 seconds.

(c) Evaluation of Immersion of Rubber

Figure 8:
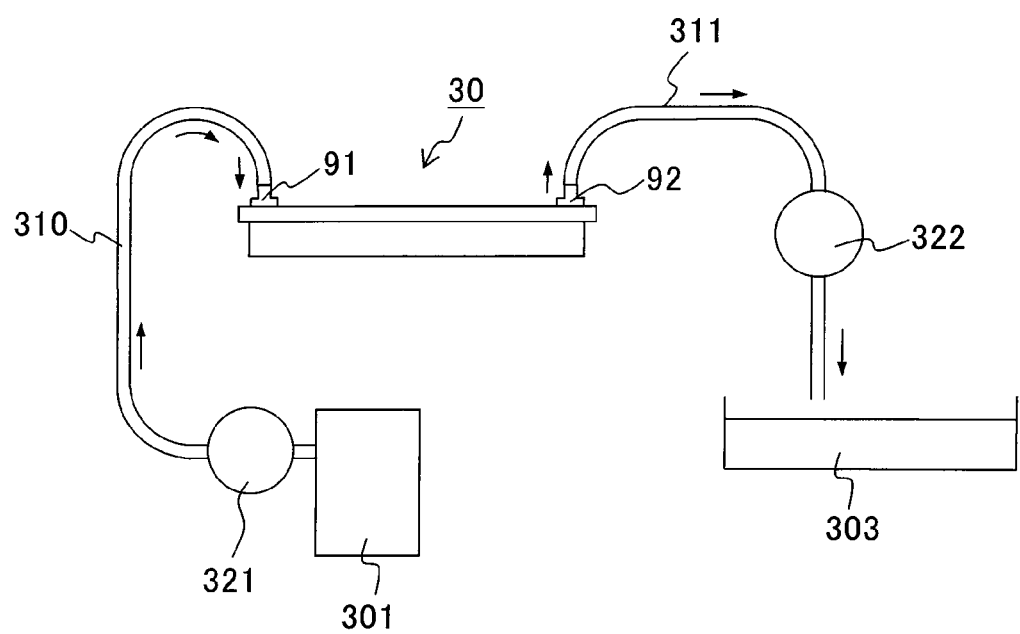
FIG. 8 schematically illustrates a method for evaluating the meniscus pressure resistance in an embodiment of the present teaching.

A rubber piece (ethylene-propylene rubber (EPDM): rubber hardness: 40° (measured in accordance with old JIS K 6301 A type)) was immersed in each of the water-based inks of Examples and Comparative Examples under a condition in which the contact area per 1 g of water-based ink was 30 mm$^2$, followed by being stored for 1 week in an environment at a temperature of 70° C. The weight change of the rubber piece was measured before and after the storage to perform the evaluation in accordance with the following evaluation criteria. When the weight of the rubber piece is increased, it is possible to judge that the rubber piece is expanded, for example, on account of the absorption of the penetrant or the like contained in the water-based ink and the rubber piece becomes brittle, as the weight change ratio is larger, wherein the compound originating from the rubber piece is eluted into the water-based ink in a larger amount. On the other hand, when the weight of the rubber piece is decreased, it is possible to judge that the compound originating from the rubber piece is eluted into the water-based ink.
Evaluation Criteria for Evaluation of Immersion of Rubber
A: Weight change ratio of rubber piece was within +3%.
B: Weight change ratio of rubber piece was within +5% while exceeding +3%.
C: Weight change ratio of rubber piece exceeded +5%, or weight of rubber piece was decreased.
 (d) Evaluation of Meniscus Pressure Resistance
As shown in FIG. 8, each of the water-based inks of Examples and Comparative Examples was introduced from an ink cartridge 301 to a line type ink-jet head 30. After that, a suction pump 322 was stopped, and the pressure was applied by using a pressurizing pump 321. The pressure was progressively raised to determine the pressure at which the leakage of the water-based ink arose from the nozzles of the line type ink-jet head 30. The meniscus pressure resistance was evaluated in accordance with the following evaluation criteria. In FIG. 8, reference numerals 91, 92 indicate joints, reference numerals 310, 311 indicate tubes (flow passage for the water-based ink), and reference numeral 303 indicates a waste liquid tank.

Evaluation Criteria for Evaluation of Meniscus Pressure Resistance
A: Leakage of water-based ink arose at not less than 5 kPa.
B: Leakage of water-based ink arose at not less than 4 kPa and less than 5 kPa.
C: Leakage of water-based ink arose at less than 4 kPa.
 (e) Overall Evaluation
In relation to Examples and Comparative Examples, the overall evaluation was performed in accordance with the following evaluation criteria on the basis of the results of (a) to (d) described above.
Evaluation criteria for overall evaluation
A: Either B or C was absent in results of (a) to (d).
B: B was present in any one of results of (a) to (d).
C: C was present in any one of results of (a) to (d).

The water-based ink compositions and the evaluation results of Examples 1 to 15 are shown in Table 1. Further, the water-based ink compositions and the evaluation results of Comparative Examples 1 to 22 are shown in Table 2.

TABLE 1

| | | | Example | | | | |
|---|---|---|---|---|---|---|---|
| | | | 1 | 2 | 3 | 4 | 5 |
| Water-based ink composition | Colorant | CAB-O-JET (trade name) 300 (*1) | 40 (6.0) | 40 (6.0) | 40 (6.0) | 40 (6.0) | 40 (6.0) |
| | Penetrant | Tetraethylene glycol monobutyl ether (X) | 1.4 | 5.6 | 3.8 | 3.8 | 4.0 |
| | | Pentaethylene glycol monobutyl ether (Y) | 0.6 | 2.4 | 1.3 | 1.3 | 1.0 |
| | Humectant | Glycerol | 28 | 22 | 25 | 20 | 25 |
| | | Polyethylene glycol | — | — | — | — | — |
| | | 1,5-Pentanediol | — | — | — | 5 | — |
| | Olfine (trade name) E1010 (*2) | | 0.2 | 0.2 | 0.2 | 0.2 | 0.2 |
| | Pure water | | balance | balance | balance | balance | balance |
| X:Y | | | 70:30 | 70:30 | 75:25 | 75:25 | 80:20 |
| Total blending amount of penetrant with respect to total amount of water-based ink | | | 2 | 8 | 5 | 5 | 5 |
| Discharge stability obtained when head was maintained in uncapped state | | | A | A | A | A | A |
| Drying performance on paper surface | | | AA | AA | AA | AA | AA |
| Immersion of rubber | | | A | A | A | A | A |
| Meniscus pressure resistance | | | A | A | A | A | A |
| Overall evaluation | | | A | A | A | A | A |

| | | | Example | | | | |
|---|---|---|---|---|---|---|---|
| | | | 6 | 7 | 8 | 9 | 10 |
| Water-based ink composition | Colorant | CAB-O-JET (trade name) 300 (*1) | 40 (6.0) | 40 (6.0) | 40 (6.0) | 40 (6.0) | 40 (6.0) |
| | Penetrant | Tetraethylene glycol monobutyl ether (X) | 4.0 | 4.0 | 1.7 | 6.8 | 1.0 |
| | | Pentaethylene glycol monobutyl ether (Y) | 1.0 | 1.0 | 0.3 | 1.2 | 1.0 |
| | Humectant | Glycerol | 25 | 25 | 28 | 22 | 28 |
| | | Polyethylene glycol | — | — | — | — | — |
| | | 1,5-Pentanediol | — | — | — | — | — |
| | Olfine (trade name) E1010 (*2) | | 0.1 | 1.0 | 0.2 | 0.2 | 0.2 |
| | Pure water | | balance | balance | balance | balance | balance |
| X:Y | | | 80:20 | 80:20 | 85:15 | 85:15 | 50:50 |
| Total blending amount of penetrant with respect to total amount of water-based ink | | | 5 | 5 | 2 | 8 | 2 |
| Discharge stability obtained when head was maintained in uncapped state | | | A | A | A | A | B |

TABLE 1-continued

|  |  |  |  |  |  |
|---|---|---|---|---|---|
| Drying performance on paper surface | AA | AA | AA | AA | A |
| Immersion of rubber | A | A | A | A | A |
| Meniscus pressure resistance | A | A | A | A | A |
| Overall evaluation | A | A | A | A | B |

| | | | Example | | | | |
|---|---|---|---|---|---|---|---|
| | | | 11 | 12 | 13 | 14 | 15 |
| Water-based ink composition | Colorant | CAB-O-JET (trade name) 300 (*1) | 40 (6.0) | 40 (6.0) | 40 (6.0) | 40 (6.0) | 40 (6.0) |
| | Penetrant | Tetraethylene glycol monobutyl ether (X) | 4.0 | 1.8 | 7.2 | 4.8 | 4.8 |
| | | Pentaethylene glycol monobutyl ether (Y) | 4.0 | 0.2 | 0.8 | 3.2 | 3.2 |
| | Humectant | Glycerol | 22 | 28 | 22 | 17 | 17 |
| | | Polyethylene glycol | — | — | — | 5 | — |
| | | 1,5-Pentanediol | — | — | — | — | 5 |
| | Olfine (trade name) E1010 (*2) | | 0.2 | 0.2 | 0.2 | 0.2 | 0.2 |
| | Pure water | | balance | balance | balance | balance | balance |
| X:Y | | | 50:50 | 90:10 | 90:10 | 60:40 | 60:40 |
| Total blending amount of penetrant with respect to total amount of water-based ink | | | 8 | 2 | 8 | 8 | 8 |
| Discharge stability obtained when head was maintained in uncapped state | | | B | A | A | B | B |
| Drying performance on paper surface | | | AA | AA | AA | AA | AA |
| Immersion of rubber | | | A | A | B | A | A |
| Meniscus pressure resistance | | | A | B | B | A | A |
| Overall evaluation | | | B | B | B | B | B |

(*1): Water dispersion of self-dispersible pigment; produced by Cabot Specialty Chemicals; pigment concentration = 15% by weight; parenthesized numeral indicates pigment solid content amount.
(*2): Acetylene glycol-based surfactant (ethylene oxide (10 mol) adduct of diol); produced by Nissin Chemical Industry Co., Ltd.
Unit of blending amount is % by weight.

TABLE 2

| | | | Comparative Example | | | | | |
|---|---|---|---|---|---|---|---|---|
| | | | 1 | 2 | 3 | 4 | 5 | 6 |
| Water-based ink composition | Colorant | CAB-O-JET (trade name) 300 (*1) | 40 (6.0) | 40 (6.0) | 40 (6.0) | 40 (6.0) | 40 (6.0) | 40 (6.0) |
| | Penetrant | Tetraethylene glycol monobutyl ether (X) | — | — | 2.4 | 8.0 | 10.5 | 12.8 |
| | | Pentaethylene glycol monobutyl ether (Y) | — | 8.0 | 5.6 | — | 4.5 | 2.3 |
| | | Triethylene glycol monobutyl ether | — | — | — | — | — | — |
| | | Dipropylene glycol monopropyl ether | — | — | — | — | — | — |
| | Humectant | Glycerol | 30 | 22 | 22 | 22 | 15 | 15 |
| | Olfine (trade name) E1010 (*2) | | 0.2 | 0.2 | 0.2 | 0.2 | 0.2 | 0.2 |
| | Pure water | | balance | balance | balance | balance | balance | balance |
| X:Y | | | — | 0:100 | 30:70 | 100:0 | 70:30 | 85:15 |
| Total blending amount of penetrant with respect to total amount of water-based ink | | | 0 | 8 | 8 | 8 | 15 | 15 |
| Discharge stability obtained when head was maintained in uncapped state | | | C | C | C | A | C | C |
| Drying performance on paper surface | | | C | A | A | AA | AA | AA |
| Immersion of rubber | | | A | A | A | C | C | C |
| Meniscus pressure resistance | | | A | A | A | C | A | A |
| Overall evaluation | | | C | C | C | C | C | C |

| | | | Comparative Example | | | | | |
|---|---|---|---|---|---|---|---|---|
| | | | 7 | 8 | 9 | 10 | 11 | 12 |
| Water-based ink composition | Colorant | CAB-O-JET (trade name) 300 (*1) | 40 (6.0) | 40 (6.0) | 40 (6.0) | 40 (6.0) | 40 (6.0) | 40 (6.0) |
| | Penetrant | Tetraethylene glycol monobutyl ether (X) | — | — | — | — | 1.6 | 6.4 |
| | | Pentaethylene glycol monobutyl ether (Y) | — | — | — | — | — | — |
| | | Triethylene glycol monobutyl ether | 2.0 | 8.0 | — | — | 0.4 | 1.6 |
| | | Dipropylene glycol monopropyl ether | — | — | 20 | 80 | — | — |

TABLE 2-continued

| | | | | | | | | |
|---|---|---|---|---|---|---|---|---|
| | Humectant | Glycerol | 28 | 22 | 28 | 22 | 28 | 22 |
| | Olfine (trade name) E1010 (*2) | | 0.2 | 0.2 | 0.2 | 0.2 | 0.2 | 0.2 |
| | Pure water | | balance | balance | balance | balance | balance | balance |
| X:Y | | | — | — | — | — | — | — |
| Total blending amount of penetrant with respect to total amount of water-based ink | | | 2 | 8 | 2 | 8 | 2 | 8 |
| Discharge stability obtained when head was maintained in uncapped state | | | A | A | C | C | A | A |
| Drying performance on paper surface | | | AA | AA | AA | AA | AA | AA |
| Immersion of rubber | | | C | C | C | C | C | C |
| Meniscus pressure resistance | | | C | C | C | C | C | C |
| Overall evaluation | | | C | C | C | C | C | C |

| | | | Comparative Example | | | | | |
|---|---|---|---|---|---|---|---|---|
| | | | 13 | 14 | 15 | 16 | 17 | 18 |
| Water-based ink composition | Colorant | CAB-O-JET (trade name) 300 (*1) | 40 (6.0) | 40 (6.0) | 40 (6.0) | 40 (6.0) | 40 (6.0) | 40 (6.0) |
| | Penetrant | Tetraethylene glycol monobutyl ether (X) | 0.4 | 1.6 | — | — | 1.6 | 6.4 |
| | | Pentaethylene glycol monobutyl ether (Y) | — | — | 0.4 | 1.6 | — | — |
| | | Triethylene glycol monobutyl ether | 1.6 | 6.4 | 1.6 | 6.4 | — | — |
| | | Dipropylene glycol monopropyl ether | — | — | — | — | 0.4 | 1.6 |
| | Humectant | Glycerol | 28 | 22 | 28 | 22 | 28 | 22 |
| | Olfine (trade name) E1010 (*2) | | 0.2 | 0.2 | 0.2 | 0.2 | 0.2 | 0.2 |
| | Pure water | | balance | balance | balance | balance | balance | balance |
| X:Y | | | — | — | — | — | — | — |
| Total blending amount of penetrant with respect to total amount of water-based ink | | | 2 | 8 | 2 | 8 | 2 | 8 |
| Discharge stability obtained when head was maintained in uncapped state | | | A | A | A | A | B | B |
| Drying performance on paper surface | | | AA | AA | AA | AA | AA | AA |
| Immersion of rubber | | | C | C | C | C | C | C |
| Meniscus pressure resistance | | | C | C | C | C | C | C |
| Overall evaluation | | | C | C | C | C | C | C |

| | | | Comparative Example | | | |
|---|---|---|---|---|---|---|
| | | | 19 | 20 | 21 | 22 |
| Water-based ink composition | Colorant | CAB-O-JET (trade name) 300 (*1) | 40 (6.0) | 40 (6.0) | 40 (6.0) | 40 (6.0) |
| | Penetrant | Tetraethylene glycol monobutyl ether (X) | 0.4 | 1.6 | — | — |
| | | Pentaethylene glycol monobutyl ether (Y) | — | — | 0.4 | 1.6 |
| | | Triethylene glycol monobutyl ether | — | — | — | — |
| | | Dipropylene glycol monopropyl ether | 1.6 | 6.4 | 1.6 | 6.4 |
| | Humectant | Glycerol | 28 | 22 | 28 | 22 |
| | Olfine (trade name) E1010 (*2) | | 0.2 | 0.2 | 0.2 | 0.2 |
| | Pure water | | balance | balance | balance | balance |
| X:Y | | | — | — | — | — |
| Total blending amount of penetrant with respect to total amount of water-based ink | | | 2 | 8 | 2 | 8 |
| Discharge stability obtained when head was maintained in uncapped state | | | C | C | C | C |
| Drying performance on paper surface | | | AA | AA | AA | AA |
| Immersion of rubber | | | C | C | C | C |
| Meniscus pressure resistance | | | C | C | C | C |
| Overall evaluation | | | C | C | C | C |

(*1): Water dispersion of self-dispersible pigment; produced by Cabot Specialty Chemicals; pigment concentration = 15% by weight; parenthesized numeral indicates pigment solid content amount.
(*2): Acetylene glycol-based surfactant (ethylene oxide (10 mol) adduct of diol); produced by Nissin Chemical Industry Co., Ltd.
Unit of blending amount is % by weight.

As shown in Table 1, in the case of the water-based inks of Examples 1 to 15, all of the evaluation results were satisfactory in relation to the discharge stability obtained when the head was maintained in the uncapped state, the drying performance on paper surface, the immersion of rubber, and the meniscus pressure resistance. In the case of the water-based inks of Examples 1 to 9, 12, and 13 in which the weight ratio (X:Y) was X:Y=70:30 to 90:10, the evaluation results were extremely satisfactory in relation to the discharge stability obtained when the head was maintained in the uncapped state. In the case of the water-based inks of Examples 1 to 11, 14, and 15 in which the weight ratio (X:Y) was X:Y=50:50 to 85:15, the evaluation results were extremely satisfactory in relation to the meniscus pressure resistance. In particular, in the case of the water-based inks of Examples 1 to 9 in which the weight ratio (X:Y) was X:Y=70:30 to 85:15, the discharge stability obtained when the head was maintained in the uncapped state, the drying performance on paper surface, the immersion of rubber, and the meniscus pressure resistance were improved in a well-balanced manner.

On the other hand, as shown in Table 2, in the case of the water-based ink of Comparative Example 1 in which the penetrant was not used, the results were unsatisfactory in relation to the evaluation of the discharge stability obtained when the head was maintained in the uncapped state and the evaluation of the drying performance on paper surface.

In the case of the water-based ink of Comparative Example 2 in which tetra-PB was not used, the result was unsatisfactory in relation to the evaluation of the discharge stability obtained when the head was maintained in the uncapped state.

In the case of the water-based ink of Comparative Example 3 in which the weight ratio (X:Y) was X:Y=30:70, the result was unsatisfactory in relation to the evaluation of the discharge stability obtained when the head was maintained in the uncapped state.

In the case of the water-based ink of Comparative Example 4 in which penta-PB was not used, the results were unsatisfactory in relation to the evaluation of the immersion of rubber and the evaluation of the meniscus pressure resistance.

In the case of the water-based inks of Comparative Examples 5 and 6 in which the total blending amount (X+Y) was 15% by weight, the results were unsatisfactory in relation to the evaluation of the discharge stability obtained when the head was maintained in the uncapped state and the evaluation of the immersion of rubber.

In the case of the water-based inks of Comparative Examples 7 and 8 in which triethylene glycol monobutyl ether (tri-PB) was used in place of tetra-PB and penta-PB as the penetrant, the results were unsatisfactory in relation to the evaluation of the immersion of rubber and evaluation of the meniscus pressure resistance. In the case of the water-based inks of Comparative Examples 9 and 10 in which dipropylene glycol monopropyl ether (DPP) was used in place of tetra-PB and penta-PB as the penetrant, the results were unsatisfactory in relation to the evaluation of the discharge stability obtained when the head was maintained in the uncapped state, the evaluation of the immersion of rubber, and the evaluation of the meniscus pressure resistance. In the case of the water-based inks of Comparative Examples 11 to 14 in which tri-PB was used in place of penta-PB, the results were unsatisfactory in relation to the evaluation of the immersion of rubber and the evaluation of the meniscus pressure resistance. In the case of the water-based inks of Comparative Examples 15 and 16 in which tri-PB was used in place of tetra-PB, the results were unsatisfactory in relation to the evaluation of the immersion of rubber and the evaluation of the meniscus pressure resistance. In the case of the water-based inks of Comparative Examples 17 to 20 in which DPP was used in place of penta-PB, the results were unsatisfactory in relation to the evaluation of the immersion of rubber and the evaluation of the meniscus pressure resistance. In the case of the water-based inks of Comparative Examples 19 and 20, the results were also unsatisfactory in relation to the evaluation of the discharge stability obtained when the head was maintained in the uncapped state. In the case of the water-based inks of Comparative Examples 21 and 22 in which DPP was used in place of tetra-PB, the results were unsatisfactory in relation to the evaluation of the discharge stability obtained when the head was maintained in the uncapped state, the evaluation of the immersion of rubber, and the evaluation of the meniscus pressure resistance.

It is noted that tetra-PB and penta-PB, which are used as the penetrants for the water-based ink of the present teaching, are not the volatile organic compounds (VOC). On the other hand, DPP, which is used as the penetrant in Comparative Examples 9, 10, and 17 to 22, is VOC. In the case of the water-based ink of the present teaching, the environmental load is reduced and the safety for the user is more enhanced as compared with any general water-based ink containing VOC as used in Comparative Examples 9, 10, and 17 to 22, because the water-based ink of the present teaching does not use VOC or the water-based ink of the present teaching makes it possible to reduce the content of VOC.

Examples 16 to 29, Comparative Examples 23 to 36, and Examples 30 to 40

An ink solvent was obtained by uniformly mixing components except for CAB-O-JET (trade name) 300 in a water-based ink composition (Tables 3 and 5). Subsequently, the ink solvent was added to CAB-O-JET (trade name) 300, followed by being mixed uniformly. After that, an obtained mixture was filtrated through a cellulose acetate type membrane filter (pore size: 3.00 μm) produced by Toyo Roshi Kaisha, Ltd. Thus, water-based inks for ink-jet recording of Examples 16 to 29, Comparative Examples 23 to 36, and Examples 30 to 40 were obtained. The compositions of the water-based inks used in Examples 30 to 35 are the same as the compositions of the water-based inks used in Examples 1 and 9 to 13 shown in Table 1 respectively.

In relation to the water-based inks of Examples and Comparative Examples, (a) the evaluation of the discharge stability obtained when the head was maintained in the uncapped state, (b) the evaluation of the drying performance on paper surface, (c) the evaluation of the immersion of rubber, and (d) the evaluation of the meniscus pressure resistance were carried out in accordance with the foregoing methods, and (e) the evaluation of the flashing restoration performance and (f) the overall evaluation were carried out in accordance with the following methods.

(e) Evaluation of Flashing Restoration Performance

The line type ink-jet head was left to stand for 24 hours in a capped state in an environment in which the temperature was 25° C. and the relative humidity was 50% in the line type ink-jet recording apparatus on which the line type ink-jet head was carried as shown in FIG. 1. After that, the flashing was performed by discharging ink droplets of 14 pL, and then lateral ruled lines of 1 dot were recorded on the 4200 paper produced by XEROX by discharging each of the water-based inks of Examples and Comparative Examples. The number of times of the flashing was determined, which was required until the horizontal ruled lines, which were equivalent to those of the reference (Reference) used in the evaluation of the discharge stability obtained when the head was maintained in the uncapped state as described above (hereinafter referred to as "evaluation test (a)"), were recordable. The flashing restoration performance was evaluated in accordance with the following evaluation criteria.

Evaluation Criteria for Evaluation of Flashing Restoration Performance

AA: Result of B or higher than B in the evaluation criteria of the evaluation test (a) was obtained by discharging ink droplets of less than 20 mL for one nozzle of the line type ink-jet head.

A: Result of B or higher than B in the evaluation criteria of the evaluation test (a) was obtained by discharging ink droplets of not less than 20 mL and less than 100 mL for one nozzle of the line type ink-jet head.

B: Result of B or higher than B in the evaluation criteria of the evaluation test (a) was obtained by discharging ink droplets of not less than 100 mL and less than 200 mL for one nozzle of the line type ink jet head.

C: Result of B or higher than B in the evaluation criteria of the evaluation test (a) was obtained by discharging ink droplets of not less than 200 mL for one nozzle of the line type ink jet head.

(f) Overall Evaluation

In relation to Examples and Comparative Examples, the overall evaluation was performed in accordance with the following evaluation criteria on the basis of the results of (a) to (e) described above.

Evaluation Criteria for Overall Evaluation

AA: All of results of (a) to (e) were in the highest ranks.

A: All of results of (a) to (e) were not less than A.

B: B was present in any one of results of (a) to (e).

C: C was present in any one of results of (a) to (e).

The water-based ink compositions and the evaluation results of Examples 16 to 29 are shown in Table 3. Further, the water-based ink compositions and the evaluation results of Comparative Examples 23 to 36 are shown in Table 4. Further, the water-based ink compositions and the evaluation results of Examples 30 to 40 are shown in Table 5.

TABLE 3

|  |  |  | Example | | | | |
|---|---|---|---|---|---|---|---|
|  |  |  | 16 | 17 | 18 | 19 | 20 |
| Water-based ink composition | Colorant | CAB-O-JET (trade name) 300 (*1) | 40 (6.0) | 40 (6.0) | 40 (6.0) | 40 (6.0) | 40 (6.0) |
|  | Penetrant | Tetraethylene glycol monobutyl ether (X) | 1.4 | 6.8 | 1.0 | 4.0 | 1.8 |
|  |  | Pentaethylene glycol monobutyl ether (Y) | 0.6 | 1.2 | 1.0 | 4.0 | 0.2 |
|  | Humectant | Glycerol | 26 | 20 | 26 | 20 | 26 |
|  |  | Ethylene glycol | 2 | — | — | — | — |
|  |  | Diethylene glycol | — | — | — | 2 | 2 |
|  |  | Triethylene glycol | — | 2 | 2 | — | — |
|  |  | Olfine (trade name) E1010 (*2) | 0.2 | 0.2 | 0.2 | 0.2 | 0.2 |
|  |  | Pure water | balance | balance | balance | balance | balance |
| X:Y |  |  | 70:30 | 85:15 | 50:50 | 50:50 | 90:10 |
| Total blending amount of penetrant with respect to total amount of water-based ink |  |  | 2 | 8 | 2 | 8 | 2 |
| Discharge stability obtained when head was maintained in uncapped state |  |  | AAA | AAA | AA | AA | AAA |
| Drying performance on paper surface |  |  | AA | AA | A | AA | AA |
| Immersion of rubber |  |  | A | A | A | A | A |
| Meniscus pressure resistance |  |  | A | A | A | A | B |
| Flashing restoration performance |  |  | AA | AA | AA | AA | AA |
| Overall evaluation |  |  | AA | AA | A | A | B |

|  |  |  | Example | | | | |
|---|---|---|---|---|---|---|---|
|  |  |  | 21 | 22 | 23 | 24 | 25 |
| Water-based ink composition | Colorant | CAB-O-JET (trade name) 300 (*1) | 40 (6.0) | 40 (6.0) | 40 (6.0) | 40 (6.0) | 40 (6.0) |
|  | Penetrant | Tetraethylene glycol monobutyl ether (X) | 7.2 | 5.6 | 1.7 | 1.0 | 4.0 |
|  |  | Pentaethylene glycol monobutyl ether (Y) | 0.8 | 2.4 | 0.3 | 1.0 | 4.0 |
|  | Humectant | Glycerol | 20 | 4 | 8 | 8 | 4 |
|  |  | Ethylene glycol | 2 | — | — | 10 | — |
|  |  | Diethylene glycol | — | 20 | 20 | 10 | — |
|  |  | Triethylene glycol | — | — | — | — | 20 |
|  |  | Olfine (trade name) E1010 (*2) | 0.2 | 0.2 | 1.0 | 0.2 | 0.2 |
|  |  | Pure water | balance | balance | balance | balance | balance |
| X:Y |  |  | 90:10 | 70:30 | 85:15 | 50:50 | 50:50 |
| Total blending amount of penetrant with respect to total amount of water-based ink |  |  | 8 | 8 | 2 | 2 | 8 |
| Discharge stability obtained when head was maintained in uncapped state |  |  | AAA | AAA | AAA | AA | AA |
| Drying performance on paper surface |  |  | AA | AA | AA | A | AA |
| Immersion of rubber |  |  | B | A | A | A | A |
| Meniscus pressure resistance |  |  | B | A | A | A | A |
| Flashing restoration performance |  |  | AA | AA | AA | AA | AA |
| Overall evaluation |  |  | B | AA | AA | A | A |

|  |  |  | Example | | | |
|---|---|---|---|---|---|---|
|  |  |  | 26 | 27 | 28 | 29 |
| Water-based ink composition | Colorant | CAB-O-JET (trade name) 300 (*1) | 40 (6.0) | 40 (6.0) | 40 (6.0) | 40 (6.0) |
|  | Penetrant | Tetraethylene glycol monobutyl ether (X) | 1.8 | 7.2 | 1.0 | 7.2 |

TABLE 3-continued

|  |  |  |  |  |  |  |
|---|---|---|---|---|---|---|
| sition |  | Pentaethylene glycol monobutyl ether (Y) | 0.2 | 0.8 | 1.0 | 0.8 |
|  | Humectant | Glycerol | 8 | 4 | 4 | 4 |
|  |  | Ethylene glycol | — | 10 | — | — |
|  |  | Diethylene glycol | 10 | — | 30 | 30 |
|  |  | Triethylene glycol | 10 | 10 | — | — |
|  | Olfine (trade name) E1010 (*2) |  | 0.2 | 0.2 | 0.2 | 0.2 |
|  | Pure water |  | balance | balance | balance | balance |
| X:Y |  |  | 90:10 | 90:10 | 50:50 | 90:10 |
| Total blending amount of penetrant with respect to total amount of water-based ink |  |  | 2 | 8 | 2 | 8 |
| Discharge stability obtained when head was maintained in uncapped state |  |  | AAA | AAA | AA | AA |
| Drying performance on paper surface |  |  | AA | AA | A | AA |
| Immersion of rubber |  |  | A | B | A | B |
| Meniscus pressure resistance |  |  | B | B | A | B |
| Flashing restoration performance |  |  | AA | AA | A | A |
| Overall evaluation |  |  | B | B | A | B |

(*1): Water dispersion of self-dispersible pigment; produced by Cabot Specialty Chemicals; pigment concentration = 15% by weight; parenthesized numeral indicates pigment solid content amount.

(*2): Acetylene glycol-based surfactant (ethylene oxide (10 mol) adduct of diol); produced by Nissin Chemical Industry Co., Ltd.

Unit of blending amount is % by weight.

TABLE 4

|  |  |  | Comparative Example | | | | |
|---|---|---|---|---|---|---|---|
|  |  |  | 23 | 24 | 25 | 26 | 27 |
| Water-based ink composition | Colorant | CAB-O-JET (trade name) 300 (*1) | 40 (6.0) | 40 (6.0) | 40 (6.0) | 40 (6.0) | 40 (6.0) |
|  | Penetrant | Tetraethylene glycol monobutyl ether (X) | — | — | — | 2.4 | 8.0 |
|  |  | Pentaethylene glycol monobutyl ether (Y) | — | — | 8.0 | 5.6 | — |
|  |  | Triethylene glycol monobutyl ether | — | — | — | — | — |
|  |  | Dipropylene glycol monopropyl ether | — | — | — | — | — |
|  | Humectant | Glycerol | 30 | 2 | 22 | 22 | 22 |
|  |  | Ethylene glycol | — | — | — | — | — |
|  |  | Diethylene glycol | — | — | — | — | — |
|  |  | Triethylene glycol | — | — | — | — | — |
|  | Olfine (trade name) E1010 (*2) |  | 0.2 | 0.2 | 0.2 | 0.2 | 0.2 |
|  | Pure water |  | balance | balance | balance | balance | balance |
| X:Y |  |  | — | — | 0:100 | 30:70 | 100:0 |
| Total blending amount of penetrant with respect to total amount of water-based ink |  |  | 0 | 0 | 8 | 8 | 8 |
| Discharge stability obtained when head was maintained in uncapped state |  |  | C | C | C | C | A |
| Drying performance on paper surface |  |  | C | C | A | A | AA |
| Immersion of rubber |  |  | A | A | A | A | C |
| Meniscus pressure resistance |  |  | A | A | A | A | C |
| Flashing restoration performance |  |  | AA | B | A | A | A |
| Overall evaluation |  |  | C | C | C | C | C |

|  |  |  | Comparative Example | | | | |
|---|---|---|---|---|---|---|---|
|  |  |  | 28 | 29 | 30 | 31 | 32 |
| Water-based ink composition | Colorant | CAB-O-JET (trade name) 300 (*1) | 40 (6.0) | 40 (6.0) | 40 (6.0) | 40 (6.0) | 40 (6.0) |
|  | Penetrant | Tetraethylene glycol monobutyl ether (X) | 12.8 | — | 8.0 | 10.5 | — |
|  |  | Pentaethylene glycol monobutyl ether (Y) | 2.3 | — | — | 4.5 | — |
|  |  | Triethylene glycol monobutyl ether | — | — | — | — | — |
|  |  | Dipropylene glycol monopropyl ether | — | — | — | — | — |

TABLE 4-continued

|  |  |  |  |  |  |  |  |
|---|---|---|---|---|---|---|---|
|  | Humectant | Glycerol | 15 | 10 | 2 | 2 | 28 |
|  |  | Ethylene glycol | — | 20 | — | — | — |
|  |  | Diethylene glycol | — | — | 20 | — | — |
|  |  | Triethylene glycol | — | — | — | 20 | 2 |
|  | Olfine (trade name) E1010 (*2) |  | 0.2 | 0.2 | 0.2 | 0.2 | 0.2 |
|  | Pure water |  | balance | balance | balance | balance | balance |
| X:Y |  |  | 85:15 | — | 100:0 | 70:30 | — |
| Total blending amount of penetrant with respect to total amount of water-based ink |  |  | 15 | 0 | 8 | 15 | 0 |
| Discharge stability obtained when head was maintained in uncapped state |  |  | C | C | AAA | B | C |
| Drying performance on paper surface |  |  | AA | C | AA | AA | C |
| Immersion of rubber |  |  | C | A | C | C | A |
| Meniscus pressure resistance |  |  | A | A | C | A | A |
| Flashing restoration performance |  |  | A | A | A | A | A |
| Overall evaluation |  |  | C | C | C | C | C |

|  |  |  | Comparative Example | | | |
|---|---|---|---|---|---|---|
|  |  |  | 33 | 34 | 35 | 36 |
| Water-based ink composition | Colorant | CAB-O-JET (trade name) 300 (*1) | 40 (6.0) | 40 (6.0) | 40 (6.0) | 40 (6.0) |
|  | Penetrant | Tetraethylene glycol monobutyl ether (X) | 8.0 | 12.8 | — | — |
|  |  | Pentaethylene glycol monobutyl ether (Y) | — | 2.3 | — | — |
|  |  | Triethylene glycol monobutyl ether | — | — | 8.0 | — |
|  |  | Dipropylene glycol monopropyl ether | — | — | — | 8.0 |
|  | Humectant | Glycerol | 20 | 13 | 12 | 12 |
|  |  | Ethylene glycol | — | 2 | — | — |
|  |  | Diethylene glycol | — | — | 10 | 10 |
|  |  | Triethylene glycol | 2 | — | — | — |
|  | Olfine (trade name) E1010 (*2) |  | 0.2 | 0.2 | 0.2 | 0.2 |
|  | Pure water |  | balance | balance | balance | balance |
| X:Y |  |  | 100:0 | 85:15 | — | — |
| Total blending amount of penetrant with respect to total amount of water-based ink |  |  | 8 | 15 | 8 | 8 |
| Discharge stability obtained when head was maintained in uncapped state |  |  | AAA | B | AAA | C |
| Drying performance on paper surface |  |  | AA | AA | AA | AA |
| Immersion of rubber |  |  | C | C | C | C |
| Meniscus pressure resistance |  |  | C | A | C | C |
| Flashing restoration performance |  |  | A | A | A | A |
| Overall evaluation |  |  | C | C | C | C |

(*1): Water dispersion of self-dispersible pigment; produced by Cabot Specialty Chemicals; pigment concentration = 15% by weight; parenthesized numeral indicates pigment solid content amount.
(*2): Acetylene glycol-based surfactant (ethylene oxide (10 mol) adduct of diol); produced by Nissin Chemical Industry Co., Ltd.
Unit of blending amount is % by weight.

TABLE 5

|  |  |  | Example | | | | | |
|---|---|---|---|---|---|---|---|---|
|  |  |  | 30 | 31 | 32 | 33 | 34 | 35 |
| Water-based ink composition | Colorant | CAB-O-JET (trade name) 300 (*1) | 40 (6.0) | 40 (6.0) | 40 (6.0) | 40 (6.0) | 40 (6.0) | 40 (6.0) |
|  | Penetrant | Tetraethylene glycol monobutyl ether (X) | 1.4 | 6.8 | 1.0 | 4.0 | 1.8 | 7.2 |
|  |  | Pentaethylene glycol monobutyl ether (Y) | 0.6 | 1.2 | 1.0 | 4.0 | 0.2 | 0.8 |
|  | Humectant | Glycerol | 28 | 22 | 28 | 22 | 28 | 22 |
|  |  | Tetraethylene glycol | — | — | — | — | — | — |
|  |  | Polyethylene glycol | — | — | — | — | — | — |
|  |  | 1,3-Propanediol | — | — | — | — | — | — |
|  |  | 1,4-Butanediol | — | — | — | — | — | — |
|  |  | 1,5-Pentanediol | — | — | — | — | — | — |
|  | Olfine (trade name) E1010 (*2) |  | 0.2 | 0.2 | 0.2 | 0.2 | 0.2 | 0.2 |
|  | Pure water |  | balance | balance | balance | balance | balance | balance |
| X:Y |  |  | 70:30 | 85:15 | 50:50 | 50:50 | 90:10 | 90:10 |
| Total blending amount of penetrant with respect to total amount of water-based ink |  |  | 2 | 8 | 2 | 8 | 2 | 8 |
| Discharge stability obtained when head was maintained in uncapped state |  |  | A | A | B | B | A | A |

TABLE 5-continued

| | | | | | | |
|---|---|---|---|---|---|---|
| Drying performance on paper surface | AA | AA | A | AA | AA | AA |
| Immersion of rubber | A | A | A | A | A | B |
| Meniscus pressure resistance | A | A | A | A | B | B |
| Flashing restoration performance | AA | AA | AA | AA | AA | AA |
| Overall evaluation | A | A | B | B | B | B |

| | | | Example | | | | |
|---|---|---|---|---|---|---|---|
| | | | 36 | 37 | 38 | 39 | 40 |
| Water-based ink composition | Colorant | CAB-O-JET (trade name) 300 (*1) | 40 (6.0) | 40 (6.0) | 40 (6.0) | 40 (6.0) | 40 (6.0) |
| | Penetrant | Tetraethylene glycol monobutyl ether (X) | 6.8 | 6.8 | 6.8 | 6.8 | 6.8 |
| | | Pentaethylene glycol monobutyl ether (Y) | 1.2 | 1.2 | 1.2 | 1.2 | 1.2 |
| | Humectant | Glycerol | 12 | 12 | 12 | 12 | 12 |
| | | Tetraethylene glycol | 10 | — | — | — | — |
| | | Polyethylene glycol | — | 10 | — | — | — |
| | | 1,3-Propanediol | — | — | 10 | — | — |
| | | 1,4-Butanediol | — | — | — | 10 | — |
| | | 1,5-Pentanediol | — | — | — | — | 10 |
| | Olfine (trade name) E1010 (*2) | | 0.2 | 0.2 | 0.2 | 0.2 | 0.2 |
| | Pure water | | balance | balance | balance | balance | balance |
| X:Y | | | 85:15 | 85:15 | 85:15 | 85:15 | 85:15 |
| Total blending amount of penetrant with respect to total amount of water-based ink | | | 8 | 8 | 8 | 8 | 8 |
| Discharge stability obtained when head was maintained in uncapped state | | | A | B | A | A | A |
| Drying performance on paper surface | | | AA | AA | AA | AA | AA |
| Immersion of rubber | | | A | A | A | A | A |
| Meniscus pressure resistance | | | A | A | A | A | A |
| Flashing restoration performance | | | AA | AA | AA | AA | AA |
| Overall evaluation | | | A | B | A | A | A |

(*1): Water dispersion of self-dispersible pigment; produced by Cabot Specialty Chemicals; pigment concentration = 15% by weight; parenthesized numeral indicates pigment solid content amount.
(*2): Acetylene glycol-based surfactant (ethylene oxide (10 mol) adduct of diol); produced by Nissin Chemical Industry Co., Ltd.
Unit of blending amount is % by weight.

As shown in Table 3, in the case of the water-based inks of Examples 16 to 19, all of the evaluation results were satisfactory in relation to the discharge stability obtained when the head was maintained in the uncapped state, the drying performance on paper surface, the immersion of rubber, the meniscus pressure resistance, and the flashing restoration performance. In particular, the discharge stability of the water-based ink, which was obtained when the head was maintained in the uncapped state in Examples 6 to 21 and 24 to 29, was more excellent than the discharge stability of the water-based ink which was obtained when the head was maintained in the uncapped state in Examples 30 to 35 (see Table 5) in which the alkylene glycol compound was not used. In the case of the water-based inks of Examples 16, 17, 20 to 23, 26, and 27 in which the weight ratio (X:Y) was X:Y=70:30 to 90:10 and the total blending amount of the humectant was not more than 28% by weight, the evaluation results were extremely satisfactory in relation to the discharge stability obtained when the head was maintained in the uncapped state. In the case of the water-based inks of Examples 16 to 19, 22 to 25, and 28 in which the weight ratio (X:Y) was X:Y=50:50 to 85:15, the evaluation results were extremely satisfactory in relation to the meniscus pressure resistance. In particular, in the case of the water-based inks of Examples 16, 17, 22, and 23 in which the weight ratio (X:Y) was X:Y=70:30 to 85:15, the discharge stability obtained when the head was maintained in the uncapped state, the drying performance on paper surface, the immersion of rubber, the meniscus pressure resistance, and the flashing restoration performance were improved in a well-balanced manner.

On the other hand, as shown in Table 4, in the case of the water-based inks of Comparative Examples 23 and 24 in which the penetrant and the alkylene glycol compound were not used, the results were unsatisfactory in relation to the evaluation of the discharge stability obtained when the head was maintained in the uncapped state and the evaluation of the drying performance on paper surface.

In the case of the water-based ink of Comparative Example 25 in which tetra-PB and the alkylene glycol compound were not used, the result was unsatisfactory in relation to the evaluation of the discharge stability obtained when the head was maintained in the uncapped state.

In the case of the water-based ink of Comparative Example 26 in which the weight ratio (X:Y) was X:Y=30:70 and the alkylene glycol compound was not used, the result was unsatisfactory in relation to the evaluation of the discharge stability obtained when the head was maintained in the uncapped state.

In the case of the water-based ink of Comparative Example 27 in which penta-PB and the alkylene glycol compound were not used, the results were unsatisfactory in relation to the evaluation of the immersion of rubber and the evaluation of the meniscus pressure resistance.

In the case of the water-based ink of Comparative Example 28 in which the total blending amount (X+Y) was 15% by weight and the alkylene glycol compound was not used, the results were unsatisfactory in relation to the evaluation of the discharge stability obtained when the head was maintained in the uncapped state and the evaluation of the immersion of rubber.

In the case of the water-based inks of Comparative Examples 29 and 32 in which the penetrant was not used, the results were unsatisfactory in relation to the evaluation of the discharge stability obtained when the head was maintained in the uncapped state and the evaluation of the drying performance on paper surface.

In the case of the water-based inks of Comparative Examples 30 and 33 in which penta-PB was not used, the results were unsatisfactory in relation to the evaluation of the immersion of rubber and the evaluation of the meniscus pressure resistance.

In the case of the water-based inks of Comparative Examples 31 and 34 in which the total blending amount (X+Y) was 15% by weight, the results were unsatisfactory in relation to the evaluation of the immersion of rubber.

In the case of the water-based ink of Comparative Example 35 in which triethylene glycol monobutyl ether was used as the penetrant in place of tetra-PB and penta-PB, the results were unsatisfactory in relation to the evaluation of the immersion of rubber and the evaluation of the meniscus pressure resistance. In the case of the water-based ink of Comparative Example 36 in which dipropylene glycol monopropyl ether was used as the penetrant in place of tetra-PB and penta-PB, the results were unsatisfactory in relation to the evaluation of the discharge stability obtained when the head was maintained in the uncapped state, the evaluation of the immersion of rubber, and the evaluation of the meniscus pressure resistance.

Further, as shown in Table 5, in the case of the water-based inks of Examples 36 to 40 in which tetraethylene glycol, polyethylene glycol, 1,3-propanediol, 1,4-butanediol, or 1,5-pentanediol was used in place of the alkylene glycol compound, the results of the evaluation of the discharge stability obtained when the head was maintained in the uncapped state were inferior to those of the water-based inks of Examples 16 to 29 shown in Table 3.

Evaluation of Water-Based Ink Set for Ink-Jet Recording
Preparation of Water-Based Ink
An ink solvent was obtained by uniformly mixing components except for CAB-O-JET (trade name) 300 in relation to a water-based ink composition (Table 6). Subsequently, the ink solvent was added to CAB-O-JET (trade name) 300, followed by being mixed uniformly. After that, an obtained mixture was filtrated through a cellulose acetate type membrane filter (pore size: 3.00 μm) produced by Toyo Roshi Kaisha, Ltd. Thus, water-based inks for ink-jet recording 1 to 13 were obtained. The compositions of the water-based inks 2 and 4 to 8 shown in Table 6 are the same as the compositions of the water-based inks used in Examples 4, and 10 to 13 shown in Table 1 and Comparative Example 1 shown in Table 2 respectively.
Preparation of Treatment Solution
Treatment solution compositions (Table 7) were mixed uniformly, and treatment solutions 1 to 10 were obtained.

TABLE 6

| | | Water-based ink | | | | |
|---|---|---|---|---|---|---|
| | | 1 | 2 | 3 | 4 | 5 |
| Colorant | CAB-O-JET (trade name) 300 (*1) | 40 (6.0) | 40 (6.0) | 40 (6.0) | 40 (6.0) | 40 (6.0) |
| Penetrant | Tetraethylene glycol monobutyl ether (X) | 3.5 | 3.8 | 4.0 | 1.0 | 4.0 |
| | Pentaethylene glycol monobutyl ether (Y) | 1.5 | 1.3 | 1.0 | 1.0 | 4.0 |
| | Diethylene glycol monobutyl ether | — | — | — | — | — |
| | Dipropylene glycol monopropyl ether | — | — | — | — | — |
| | Triethylene glycol methyl ether | — | — | — | — | — |
| Humectant | Glycerol | 25 | 20 | 20 | 28 | 22 |
| | Polyethylene glycol | — | — | 5 | — | — |
| | 1,5-Pentanediol | — | 5 | — | — | — |
| Olfine (trade name) E1010 (*2) | | 0.2 | 0.2 | 1.0 | 0.2 | 0.2 |
| Pure water | | balance | balance | balance | balance | balance |
| X:Y | | 70:30 | 75:25 | 80:20 | 50:50 | 50:50 |
| Total blending amount of penetrant with respect to total amount of water-based ink | | 5 | 5 | 5 | 2 | 8 |

| | | Water-based ink | | | | |
|---|---|---|---|---|---|---|
| | | 6 | 7 | 8 | 9 | 10 |
| Colorant | CAB-O-JET (trade name) 300 (*1) | 40 (6.0) | 40 (6.0) | 40 (6.0) | 40 (6.0) | 40 (6.0) |
| Penetrant | Tetraethylene glycol monobutyl ether (X) | 1.8 | 7.2 | — | — | 5.0 |
| | Pentaethylene glycol monobutyl ether (Y) | 0.2 | 0.8 | — | 5.0 | — |
| | Diethylene glycol monobutyl ether | — | — | — | — | — |
| | Dipropylene glycol monopropyl ether | — | — | — | — | — |
| | Triethylene glycol methyl ether | — | — | — | — | — |
| Humectant | Glycerol | 28 | 22 | 30 | 25 | 25 |
| | Polyethylene glycol | — | — | — | — | — |
| | 1,5-Pentanediol | — | — | — | — | — |
| Olfine (trade name) E1010 (*2) | | 0.2 | 0.2 | 0.2 | 0.2 | 0.2 |
| Pure water | | balance | balance | balance | balance | balance |
| X:Y | | 90:10 | 90:10 | — | 0:100 | 100:0 |
| Total blending amount of penetrant with respect to total amount of water-based ink | | 2 | 8 | 0 | 5 | 5 |

TABLE 6-continued

|  |  | Water-based ink | | |
|---|---|---|---|---|
|  |  | 11 | 12 | 13 |
| Colorant | CAB-O-JET (trade name) 300 (*1) | 40 (6.0) | 40 (6.0) | 40 (6.0) |
| Penetrant | Tetraethylene glycol monobutyl ether (X) | — | — | — |
|  | Pentaethylene glycol monobutyl ether (Y) | — | — | — |
|  | Diethylene glycol monobutyl ether | 5.0 | — | — |
|  | Dipropylene glycol monopropyl ether | — | 5.0 | — |
|  | Triethylene glycol methyl ether | — | — | 5.0 |
| Humectant | Glycerol | 25 | 25 | 25 |
|  | Polyethylene glycol | — | — | — |
|  | 1,5-Pentanediol | — | — | — |
| Olfine (trade name) E1010 (*2) | | 1.2 | 0.2 | 0.2 |
| Pure water | | balance | balance | balance |
| X:Y | | — | — | — |
| Total blending amount of penetrant with respect to total amount of water-based ink | | 5 | 5 | 5 |

(*1): Water dispersion of self-dispersible pigment; produced by Cabot Specialty Chemicals; pigment concentration = 15% by weight; parenthesized numeral indicates pigment solid content amount.
(*2): Acetylene glycol-based surfactant (ethylene oxide (10 mol) adduct of diol); produced by Nissin Chemical Industry Co., Ltd.
Unit of blending amount is % by weight.

TABLE 7

|  |  | Treatment solution | | | | |
|---|---|---|---|---|---|---|
|  |  | 1 | 2 | 3 | 4 | 5 |
| Aggregating agent | Dimethyl ethyl lauryl ammonium ethylsulfate | 4 | — | — | — | — |
|  | Dimethyl ethyl octyl ammonium ethylsulfate | — | 4 | — | — | 4 |
|  | Calcium nitrate | — | — | 5 | 5 | — |
| Penetrant | Triethylene glycol monobutyl ether | 5.0 | 5.0 | 5.0 | 2.0 | 8.0 |
|  | Diethylene glycol monobutyl ether | — | — | — | — | — |
|  | Dipropylene glycol monopropyl ether | — | — | — | — | — |
|  | Triethylene glycol methyl ether | — | — | — | — | — |
| Humectant | Glycerol | 41.0 | 36.0 | 36.0 | 44.0 | 38.0 |
|  | Polyethylene glycol | — | 5 | — | — | — |
|  | 1,5-Pentanediol | — | — | 5 | — | — |
| Olfine (trade name) E1010 (*2) | | 1.0 | 1.0 | 0.5 | 1.0 | 1.0 |
| Pure water | | balance | balance | balance | balance | balance |

|  |  | Treatment solution | | | | |
|---|---|---|---|---|---|---|
|  |  | 6 | 7 | 8 | 9 | 10 |
| Aggregating agent | Dimethyl ethyl lauryl ammonium ethylsulfate | — | 4 | 4 | — | — |
|  | Dimethyl ethyl octyl ammonium ethylsulfate | 4 | — | — | 4 | 4 |
|  | Calcium nitrate | — | — | — | — | — |
| Penetrant | Triethylene glycol monobutyl ether | 15.0 | — | — | — | — |
|  | Diethylene glycol monobutyl ether | — | — | 5.0 | — | — |
|  | Dipropylene glycol monopropyl ether | — | — | — | 5.0 | — |
|  | Triethylene glycol methyl ether | — | — | — | — | 5.0 |

TABLE 7-continued

| Humectant | Glycerol | 31.0 | 46.0 | 41.0 | 41.0 | 41.0 |
|---|---|---|---|---|---|---|
| | Polyethylene glycol | — | — | — | — | — |
| | 1,5-Pentanediol | — | — | — | — | — |
| Olfine (trade name) E1010 (*2) | | 1.0 | 1.0 | 1.0 | 1.0 | 1.0 |
| Pure water | | balance | balance | balance | balance | balance |

(*2): Acetylene glycol-based surfactant (ethylene oxide (10 mol) adduct of diol); produced by Nissin Chemical Industry Co., Ltd.
Unit of blending amount is % by weight.

Subsequently, the water-based inks described above and the treatment solutions described above were combined with each other as shown in Tables 8 and 9, and thus ink sets 1 to 20 were obtained.

In relation to the water-based ink sets 1 to 20, (a) the evaluation of the optical density (OD value), (b) the evaluation of the drying performance on paper surface, (c) the evaluation of the discharge stability of the water-based ink obtained when the head was maintained in the uncapped state, (d) the evaluation of the meniscus pressure resistance of the water-based ink, and (e) the overall evaluation were carried out in accordance with the following methods. It is noted that (c) the evaluation of the discharge stability of the water-based ink obtained when the head was maintained in the uncapped state and (d) the evaluation of the meniscus pressure resistance of the water-based ink were carried out in the same manner as in the methods described above, and hence the methods for carrying out the evaluation are omitted from the explanation.

(a) Evaluation of Optical Density (OD Value)

Recording of solid printing was performed with a liquid droplet amount of 14 µL per one nozzle of each of the treatment solution discharge head and the ink jet head at 600 dpi and 100% Duty on the 4200 paper produced by XEROX by continuously discharging each of the treatment solutions and the water-based inks of the water-based ink sets 1 to 20 by using the line type ink jet recording apparatus on which the line type head was carried as shown in FIG. 5. Subsequently, the optical density (OD value) of the solid printing recording portion was measured by using a spectrophotometer SpectroEye produced by X-Rite (light source: $D_{50}$, field angle: 2°, density: ANSI T), and the evaluation was performed in accordance with the following evaluation criteria.

Evaluation Criteria for Evaluation of Optical Density (OD Value)

AA: OD value of solid printing recording portion was not less than 1.27.
A: OD value of solid printing recording portion was not less than 1.24 and less than 1.27.
B: OD value of solid printing recording portion was not less than 1.21 and less than 1.24.
C: OD value of solid printing recording portion was less than 1.21.

(b) Evaluation of Drying Performance on Paper Surface

100% solid printing was recorded at 600 dpi on the 4200 paper produced by XEROX by continuously discharging each of the treatment solutions and the water-based inks of the water-based ink sets 1 to 20 by using the line type ink-jet recording apparatus on which the line type ink-jet head was carried as shown in FIG. 5. The time, which elapsed until the treatment solution and the water-based ink disappeared from the paper surface after the recording of solid printing, was measured to evaluate the drying performance on paper surface in accordance with the following evaluation criteria.

Evaluation Criteria for Evaluation of Drying Performance on Paper Surface

AA: Treatment solution and water-based ink disappeared from paper surface within 3 seconds.
A: Treatment solution and water-based ink disappeared from paper surface within 5 seconds while exceeding 3 seconds.
B: Treatment solution and water-based ink disappeared from paper surface within 10 seconds while exceeding 5 seconds.
C: Treatment solution and water-based ink disappeared from paper surface after exceeding 10 seconds.

(e) Overall Evaluation

The overall evaluation was performed in accordance with the following evaluation criteria on the basis of the results of (a) to (d) described above.

Evaluation Criteria for Overall Evaluation

A: Either B or C was absent in results of (a) to (d).
B: B was present in any one of results of (a) to (d).
C: C was present in any one of results of (a) to (d).

The evaluation results are shown in Tables 8 and 9.

TABLE 8

| | Water-based ink set for ink-jet recording | | | | | | | | | |
|---|---|---|---|---|---|---|---|---|---|---|
| | 1 | 2 | 3 | 4 | 5 | 6 | 7 | 8 | 9 | 10 |
| Water-based ink | 1 | 2 | 3 | 4 | 5 | 6 | 7 | 4 | 6 | 1 |
| Treatment solution | 1 | 2 | 3 | 1 | 5 | 2 | 4 | 4 | 5 | 6 |
| Optical density (OD value) | AA | AA | AA | AA | AA | AA | AA | AA | AA | A |
| Drying performance on paper surface | A | A | A | A | A | A | A | A | A | AA |
| Discharge stability of water-based ink obtained when head was maintained in uncapped state | A | A | A | B | B | A | A | B | A | A |
| Meniscus pressure resistance of water-based ink | A | A | A | A | A | B | B | A | B | A |
| Overall evaluation | A | A | A | B | B | B | B | B | B | A |

TABLE 9

| | Water-based ink set for ink-jet recording | | | | | | | | | |
|---|---|---|---|---|---|---|---|---|---|---|
| | 11 | 12 | 13 | 14 | 15 | 16 | 17 | 18 | 19 | 20 |
| Water-based ink | 8 | 9 | 10 | 11 | 12 | 13 | 1 | 2 | 3 | 1 |
| Treatment solution | 1 | 1 | 2 | 3 | 1 | 2 | 7 | 8 | 9 | 10 |
| Optical density (OD value) | A | AA | A | A | A | AA | B | C | C | B |
| Drying performance on paper surface | C | B | A | B | A | C | C | AA | A | C |
| Discharge stability of water-based ink obtained when head was maintained in uncapped state | C | C | A | C | C | C | A | A | A | A |
| Meniscus pressure resistance of water-based ink | A | A | C | C | C | A | A | A | A | A |
| Overall evaluation | C | C | C | C | C | C | C | C | C | C |

As shown in Table 8, in the case of the water-based ink sets 1 to 10, all of the evaluation results were satisfactory in relation to the optical density (OD value), the drying performance on paper surface, the discharge stability of the water-based ink obtained when the head was maintained in the uncapped state, and the meniscus pressure resistance of the water-based ink. In particular, in the case of the water-based ink sets 1 to 3 and 10 in which the weight ratio (X:Y) was X:Y=70:30 to 85:15 in the water-based inks, the optical density (OD value), the drying performance on paper surface, the discharge stability of the water-based ink obtained when the head was maintained in the uncapped state, and the meniscus pressure resistance of the water-based ink were improved in a well-balanced manner. Further, in the case of the water-based ink sets 1 to 9 in which the blending amount of tri-PB was 1% by weight to 10% by weight in the treatment solutions, the optical density (OD value) was more improved. Further, in the case of the water-based ink set 10 in which the blending amount of the penetrant was 15.0% in the treatment solution, the drying performance on paper surface was more improved.

On the other hand, as shown in Table 9, in the case of the water-based ink set 11 in which the penetrant was not used in the water-based ink, the results were unsatisfactory in relation to the evaluation of the drying performance on paper surface and the evaluation of the discharge stability of the water-based ink obtained when the head was maintained in the uncapped state. In the case of the water-based ink set 12 in which tetra-PB was not used in the water-based ink, the result was unsatisfactory in relation to the evaluation of the discharge stability of the water-based ink obtained when the head was maintained in the uncapped state. In the case of the water-based ink set 13 in which penta-PB was not used in the water-based ink, the result was unsatisfactory in relation to the evaluation of the meniscus pressure resistance of the water-based ink.

In the case of the water-based ink sets 14 and 15 in which diethylene glycol monobutyl ether (di-PB) or dipropylene glycol monopropyl ether (DPP) was used as the penetrant in place of tetra-PB and penta-PB, the results were unsatisfactory in relation to the evaluation of the discharge stability of the water-based ink obtained when the head was maintained in the uncapped state and the evaluation of the meniscus pressure resistance of the water-based ink. In the case of the water-based ink set 16 in which triethylene glycol methyl ether was used as the penetrant in place of tetra-PB and penta-PB, the results were unsatisfactory in relation to the evaluation of the drying performance on paper surface and the evaluation of the discharge stability of the water-based ink obtained when the head was maintained in the uncapped state.

In the case of the water-based ink set 17 in which any penetrant was not used in the treatment solution, the result was unsatisfactory in relation to the evaluation of the drying performance on paper surface. In the case of the water-based ink sets 18 and 19 in which di-PB or DPP was used as the penetrant in place of tri-PB in the treatment solution, the results were unsatisfactory in relation to the evaluation of the optical density (OD value). In the case of the water-based ink set 20 in which triethylene glycol methyl ether was used as the penetrant in place of tri-PB in the treatment solution, the result was unsatisfactory in relation to the evaluation of the drying performance on paper surface.

It is noted that tetra-PB and penta-PB which are used as the penetrants for the water-based ink and tri-PB which is used as the penetrant for the treatment solution in the water-based ink set of the present teaching are not the volatile organic compounds (VOC). The water-based ink set of the present teaching does not use any VOC such as DPP or the like included in the water-based ink set 15 (Water-based ink 12) and the water-based ink set 19 (Treatment solution 9), or the water-based ink set of the present teaching makes it possible to reduce the content of VOC. Therefore, the environmental load is reduced and the safety for the user is more enhanced as compared with any general water-based ink set containing VOC.

As described above, the water-based ink of the present teaching is excellent in the discharge stability obtained when the head is maintained in the uncapped state and the drying performance on paper surface. Further, any compound, which originates, for example, from any rubber member included in the ink jet recording apparatus, is suppressed from being eluted into the water-based ink. The way of use of the water-based ink of the present teaching is not specifically limited. The water-based ink of the present teaching is widely applicable to various types of the ink jet recording.

Further, the water-based ink set of the present teaching improves the optical density (OD value) of the recorded matter while suppressing the decrease in the drying performance on paper surface. The way of use of the water-based ink set of the present teaching is not specifically limited. The water-based ink set of the present teaching is widely applicable to various types of the ink jet recording.

What is claimed is:
1. A water-based ink for ink jet recording, comprising:
a colorant;
water; and
tetraethylene glycol monobutyl ether and pentaethylene glycol monobutyl ether, wherein:
tetraethylene glycol monobutyl ether and pentaethylene glycol monobutyl ether are contained by 1% by weight to 10% by weight in total in the water-based ink for ink-jet recording; and
a weight ratio (X:Y) of tetraethylene glycol monobutyl ether (X) to pentaethylene glycol monobutyl ether (Y) is 50:50 to 90:10.

2. The water-based ink for ink jet recording according to claim 1, wherein the weight ratio (X:Y) of tetraethylene glycol monobutyl ether (X) to pentaethylene glycol monobutyl ether (Y) is 70:30 to 85:15.

3. The water-based ink for ink jet recording according to claim 1, further comprising:
   glycerol; and
   at least one selected from the group consisting of ethylene glycol, diethylene glycol, and triethylene glycol.

4. An ink cartridge comprising the water-based ink for ink-jet recording as defined in claim 1.

5. A water-based ink set for ink jet recording, comprising:
   the water-based ink for ink jet recording as defined in claim 1; and
   a treatment solution which aggregates the colorant contained in the water-based ink for ink-jet recording.

6. The water-based ink set for ink jet recording according to claim 5, wherein the treatment solution contains an aggregating agent which aggregates the colorant contained in the water-based ink for ink-jet recording, water, and triethylene glycol monobutyl ether.

7. The water-based ink set for ink-jet recording according to claim 6, wherein triethylene glycol monobutyl ether is contained by 1% by weight to 10% by weight in the treatment solution.

8. The water-based ink set for ink-jet according to claim 6, wherein the water-based ink for ink-jet recording further comprises glycerol and at least one selected from the group consisting of ethylene glycol, diethylene glycol, and triethylene glycol.

9. An ink-jet recording method for performing recording on a recording medium, comprising:
   preparing the water-based ink for ink-jet recording as defined in claim 1; and
   discharging the water-based ink for ink-jet recording onto the recording medium.

10. The ink-jet recording method according to claim 9, further comprising applying, to the recording medium, a treatment solution which aggregates the colorant contained in the water-based ink for ink-jet recording.

11. The ink-jet recording method according to claim 10, wherein the treatment solution contains an aggregating agent which aggregates the colorant contained in the water-based ink for ink-jet recording, water, and triethylene glycol monobutyl ether.

12. The ink-jet recording method according to claim 10, wherein the water-based ink for ink-jet recording is discharged onto the recording medium after applying the treatment solution to the recording medium.

13. An ink-jet recording apparatus for performing recording on a recording medium, comprising:
   an ink accommodating section which accommodates the water-based ink for ink-jet recording as defined in claim 1; and
   an ink discharge mechanism which discharges, onto the recording medium, the water-based ink for ink-jet recording accommodated in the ink accommodating section.

14. An inkjet recording apparatus for performing recording on a recording medium, comprising:
   an ink set accommodating section which accommodates the water-based ink set for inkjet recording as defined in claim 5;
   an ink discharge mechanism which discharges, onto the recording medium, the water-based ink for inkjet recording of the ink set accommodated in the ink set accommodating section; and
   a treatment solution applying mechanism which applies, to the recording medium, the treatment solution of the ink set accommodated in the ink set accommodating section.

15. The ink jet recording apparatus according to claim 14, wherein the treatment solution applying mechanism is a treatment solution discharge mechanism or a treatment solution coating mechanism.

16. The ink jet recording apparatus according to claim 13, further comprising a maintenance mechanism which includes a rubber member.

17. The ink jet recording apparatus according to claim 16, wherein:
   the ink discharge mechanism has an ink discharge surface from which the water-based ink is discharged; and
   the maintenance mechanism is a wiper which wipes the ink discharge surface or a cap which shuts off the ink discharge surface from an external environment.

18. The water-based ink for ink jet recording according to claim 1, further comprising:
   a penetrant comprising tetraethylene glycol monobutyl ether, pentaethylene glycol monobutyl ether, or both; and
   a humectant;
   wherein a weight ratio of the penetrant with respect to the humectant is in a range of 2/34 to 8/22.

19. The water-based ink for ink jet recording according to claim 1, further comprising a humectant contained in a range of 22% by weight to 34% by weight in the water-based ink.

20. The water-based ink for ink jet recording according to claim 1, further comprising a humectant containing ethylene glycol, diethylene glycol, triethylene glycol, or a combination thereof;
   wherein a weight ratio of the ethylene glycol, diethylene glycol, triethylene glycol, or a combination thereof in the humectant is in a range of 2/28 to 30/34.

21. The water-based ink for ink jet recording according to claim 1, further comprising
   glycerol; and
   an additive selected from the group consisting of ethylene glycol, diethylene glycol, triethylene glycol, and combinations thereof;
   wherein a weight ratio of the additive with respect to glycerol is in a range of 2/26 to 30/4.

* * * * *